(12) United States Patent
Tomikawa et al.

(10) Patent No.: US 8,599,652 B2
(45) Date of Patent: Dec. 3, 2013

(54) THERMALLY-ASSISTED MAGNETIC RECORDING MEDIUM AND MAGNETIC RECORDING/REPRODUCING DEVICE USING THE SAME

(75) Inventors: Satoshi Tomikawa, Tokyo (JP); Tomohito Mizuno, Tokyo (JP)

(73) Assignee: TDK Corporation, Tokyo (JP)

( * ) Notice: Subject to any disclaimer, the term of this patent is extended or adjusted under 35 U.S.C. 154(b) by 196 days.

(21) Appl. No.: 13/182,623

(22) Filed: Jul. 14, 2011

(65) Prior Publication Data

US 2013/0016591 A1   Jan. 17, 2013

(51) Int. Cl.
*G11B 11/00* (2006.01)

(52) U.S. Cl.
USPC .......... 369/13.02; 369/13.13; 369/288; 428/846.2; 428/846.3

(58) Field of Classification Search
USPC .......... 369/13.33, 13.32, 13.24, 13.14, 13.03, 369/13.02, 13.12, 13.13, 13.01, 13.35, 369/112.27, 275.3, 275.1, 283, 288; 428/831, 846.2, 831.1, 846.3; 360/59, 360/125.31, 125.74, 125.75
See application file for complete search history.

(56) References Cited

U.S. PATENT DOCUMENTS

| 8,102,736 | B2 * | 1/2012 | Takayama et al. | 369/13.33 |
| 8,130,599 | B2 * | 3/2012 | Komura et al. | 369/13.33 |
| 8,268,461 | B1 * | 9/2012 | Hellwig et al. | 428/831 |
| 8,320,232 | B1 * | 11/2012 | Marinero et al. | 369/288 |
| 2007/0026263 | A1 | 2/2007 | Kubota et al. | |
| 2012/0051196 | A1 * | 3/2012 | Grobis et al. | 369/13.24 |

FOREIGN PATENT DOCUMENTS

| JP | A-2009-158053 | 7/2009 |
| JP | A-2010-158053 | 7/2010 |
| JP | A-2010-176747 | 8/2010 |
| JP | A-2010-176748 | 8/2010 |
| JP | A-2010-182386 | 8/2010 |

OTHER PUBLICATIONS

S. N. Piramanayagam, "Perpendicular recording media for hard disk drives," *Journal of Applied Physics*, 102, 011301 (2007).

* cited by examiner

*Primary Examiner* — Ali Neyzari
(74) *Attorney, Agent, or Firm* — Posz Law Group, PLC

(57) ABSTRACT

A thermally-assisted magnetic recording (TAMR) medium of the present invention includes: a magnetization direction arrangement layer on a substrate; and a magnetic recording layer on the magnetization direction arrangement layer, wherein the magnetization direction arrangement layer is made of at least one selected from a group consisting of Co, Zr, CoZr, CoTaZr, CoFeTaZrCr, CoNbZr, CoNiZr, FeCoZr-BCu, NiFe, FeCo, FeAlN, (FeCo)N, FeAlSi, and FeTaC so that a spreading of the heating spot applied from the magnetic head for thermally-assisted recording to the film surface of the magnetic recording medium is suppressed, and that an SN is improved by arranging the magnetization direction of the perpendicularly written recording magnetization to become identical to a perpendicular direction, and realizing the higher recording density.

20 Claims, 14 Drawing Sheets

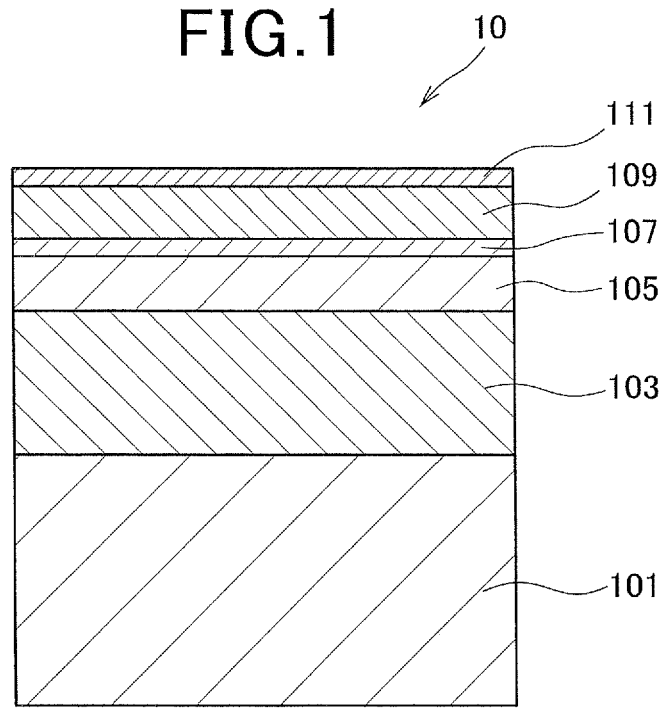
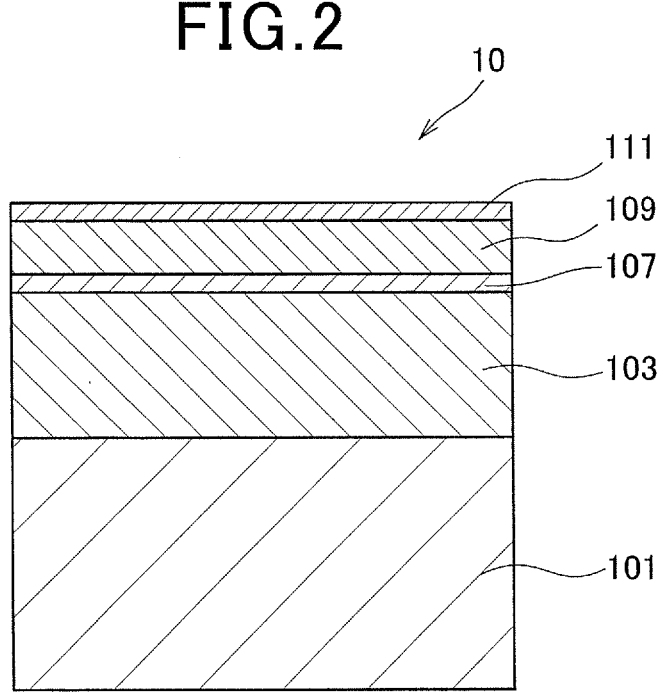

THERMALLY-ASSISTED MAGNETIC RECORDING MEDIUM AND MAGNETIC RECORDING/REPRODUCING DEVICE USING THE SAME

BACKGROUND

1. Field of the Invention

The present invention relates to a magnetic recording medium and particularly to a so-called thermally-assisted magnetic recording medium where information is recorded by applying an external magnetic field while local heating is performed to a portion of the medium. More specifically, the present invention relates to the thermally-assisted magnetic recording medium where information is recorded by applying the external magnetic field while the local heating is performed to reduce coercive force of a recording film by laser light irradiation, near-field light irradiation and the like, and also relates to a magnetic recording/reproducing device using the thermally-assisted magnetic recording medium.

2. Description of the Prior Art

In recent years, regarding magnetic recording/reproducing devices such as magnetic disk devices, etc., it has been required to improve the respective performances of a thin film magnetic head and a magnetic recording medium in conjunction with higher recording density.

A magnetic recording layer of the magnetic recording medium mounted in a magnetic disk device is formed with an aggregation of magnetic microparticles, and each of the magnetic microparticles has a single magnetic domain structure. Then, one set of information in a perpendicular direction (one recording bit), for example, is recorded using a plurality of the magnetic microparticles. In order to enhance the recording density with the magnetic recording medium structured as described above, unevenness between the magnetic microparticles at boundaries of the recording bits needs to be reduced. Therefore, the volume V of the magnetic microparticles needs to be reduced.

However, thermal stability may be deteriorated when the volume V of the magnetic microparticles is excessively reduced, and therefore, magnetization directions may be disarranged because of the influence of temperature or the like. Accordingly, it is required to reduce the volume V of the magnetic microparticles without losing the thermal stability.

A thermal fluctuation index, which is an indication of the thermal stability, is given by $K_u V/K_B T$. Herein, $K_u$ is an anisotropy energy constant of the magnetic microparticles, V is the volume of each magnetic microparticle, $K_B$ is Boltzmann constant, and T is the absolute temperature. When the volume of each magnetic microparticle is simply reduced to enhance the recording density, the thermal fluctuation index is lowered, the thermal stability is deteriorated, and therefore it becomes unable to perform the recording.

In order to solve such thermal fluctuation problem, it needs to use a magnetic material having a large anisotropy energy constant $K_u$. However, since the coercive force He of the magnetic microparticles becomes larger in proportion to the anisotropy energy constant $K_u$, a disadvantage occurs that it becomes unable to perform the recording with a conventional head.

As a method to solve such problem, a so-called thermally-assisted magnetic recording (TAMR) method has been proposed. The TAMR method is a method for recording information while He of the magnetic microparticles is reduced by heating a minute area (recording bit), which is a recording target of the magnetic recording medium, by laser light, near-field light or the like during the recording. Therefore, a magnetic material having a larger He than a recording head magnetic field H at a room temperature can be used. Also, the volume V of each magnetic microparticle can be reduced without lowering the thermal fluctuation index which is the indication of the thermal stability, and therefore it becomes possible to achieve the higher recording density.

JP Laid-Open Patent Application No. 2010-176747 and JP Laid-Open Patent Application No. 2009-158053, for example, disclose magnetic recording mediums which are preferable to be used for the conventional TAMR method.

JP Laid-Open Patent Application No. 2010-176747 discloses the magnetic recording medium which is used for a magnetic recording/reproducing device that performs a signal writing at a temperature higher than a temperature for a signal holding, and is configured by laminating a soft under layer, a thermal transfer prevention layer, an under layer, a magnetic recording layer, and a protective layer in this order. The magnetic recording medium of the publication features a thermal transfer prevention layer, which is formed of $SiO_2$, $TiO_2$, $Y_2O_3$, $Al_2O_3$, SiN, TiN, AlN, TiC, SiC or the like, that is disposed for the purpose of shielding thermal transfer from the recording layer side to the soft under layer. Similarly, the publication discloses that, for example, Ru, Re, Rh, Pt, Pd, Ir, Ni, Co, Cu or an alloy containing these materials is preferably used for the under layer, which controls a crystal lattice diameter and a crystal lattice orientation of the material of the recording layer and prevents a magnetic coupling between the soft under layer and the recording layer. Also, the publication discloses that a protective layer formed of carbon as a primary component is used for the protective layer formed on a magnetic layer, and that a lamination film configured with a metal film and a carbon film, and a lamination film configured with a film formed of a metal oxide and a carbon film can be used for the protective layer as well.

Also, JP Laid-Open Patent Application No. 2009-158053 discloses the magnetic recording medium that can be heated with less power consumption and also has an excellent writing performance, in which a cap layer formed of Fe—Pt alloy or Co—Cr—Cr—Pt—B alloy is disposed on a granular magnetic recording layer of the medium and a crystal orientation control and low thermal transfer intermediate layer formed of Ti—Al—V is disposed below the granular magnetic recording layer.

However, the media disclosed in the respective above-described publications are not media having a most preferable lamination film configuration as a magnetic recording medium used for thermally-assisted recording. With the mediums, spreading of a heating spot applied from a magnetic head for thermally-assisted recording to a film surface of the magnetic recording medium cannot be sufficiently suppressed so that an obstacle to achieve higher density recording may occur, and the magnetization direction of a perpendicularly written magnetization cannot be stabilized so that signal to noise ratio (SN) is deteriorated causing difficulties to achieve the higher recording density.

It is objective of the present invention, which is invented under such situations, to provide a thermally-assisted magnetic recording medium that can sufficiently suppress the spreading of the heating spot applied from the magnetic head for thermally-assisted recording to the film surface of the magnetic recording medium, that improves the SN by arranging the magnetization direction of the perpendicularly written recording magnetization to become identical to a perpendicular direction, and that can realize the higher recording density.

SUMMARY OF THE INVENTION

In order to achieve the objects, a thermally-assisted magnetic recording (TAMR) medium of the present invention includes: a magnetization direction arrangement layer on a substrate; and a magnetic recording layer on the magnetization direction arrangement layer. The magnetization direction arrangement layer is made of at least one selected from a group consisting of Co, Zr, CoZr, CoTaZr, CoFeTaZrCr, CoNbZr, CoNiZr, FeCoZrBCu, NiFe, FeCo, FeAlN, (FeCo)N, FeAlSi, and FeTa.

Moreover, as a preferred embodiment of the TAMR medium of the present invention, the magnetization direction arrangement layer has a thickness of 1-5 nm.

Moreover, a preferred embodiment of the TAMR medium of the present invention further includes a thermal barrier layer below the magnetization direction arrangement layer. The thermal barrier layer is made of at least one selected from a group consisting of MgO, TiOx, RuAl, Cr, ZnO, TiN, and $B_2O_3$.

Moreover, a preferred embodiment of the TAMR medium of the present invention further includes a heat sink layer below the magnetization direction arrangement layer. The heat sink layer is made of at least either a simple substance or an alloy selected from a group consisting of Cu, Ag, and Au.

Moreover, a preferred embodiment of the TAMR medium of the present invention further includes a soft under layer (SUL) below the magnetization direction arrangement layer.

Moreover, a preferred embodiment of the TAMR medium of the present invention further includes a soft under layer (SUL) below the thermal barrier layer.

Moreover, a preferred embodiment of the TAMR medium of the present invention further includes a soft under layer (SUL) below the heat sink layer.

Moreover, a preferred embodiment of the TAMR medium of the present invention further includes a thermal barrier layer between the magnetization direction arrangement layer and the magnetic recording layer.

Moreover, as a preferred embodiment of the TAMR medium of the present invention, the magnetic recording layer is either a granular-system magnetic layer formed of CoCrPt—$SiO_2$, FePt—C, FePt—$SiO_2$, FePtCu—C, or FePtCu—SiO or a multilayer film magnetic layer formed of Co/Pd or CoB/Pd.

Moreover, a preferred embodiment of the TAMR medium of the present invention includes a protective layer on the magnetic recording layer. The protective layer is made of diamond like carbon (DLC).

A magnetic recording/reproducing device of the present invention includes: the above magnetic recording medium; and a thermally-assisted magnetic head for recording/reproducing magnetic signals to the magnetic recording medium.

BRIEF DESCRIPTION OF THE DRAWINGS

FIG. 1 is a cross-sectional view schematically illustrating a configuration example of a thermally-assisted magnetic recording (TAMR) medium of the present invention.

FIG. 2 is a cross-sectional view schematically illustrating another configuration example of the TAMR medium of the present invention.

DETAILED DESCRIPTION OF THE INVENTION

Hereinafter, a detailed description regarding most preferable embodiments for the present invention is given.

Prior to explaining a TAMR medium of the present invention, a description regarding a preferable example of a TAMR head for recording/reproducing magnetic information to/of the TAMR medium is given.

The TAMR head is a member of a main portion that configures a magnetic recording/reproducing device as well as the TAMR medium of the present invention.

Note, the TAMR head, which is described below in detail, configuring the magnetic recording/reproducing device is one preferable example, but is not limited to its configuration.

[Description of One Configuration Example of TAMR Head]

Prior to explaining one preferable configuration example of the TAMR head, terminologies used in the present specification are defined. In a lamination structure or an element structure formed on an element formation surface of a slider substrate of the TAMR head, from a perspective of a layer or element to be a standard, a substrate side is referred to as "lower (below)," and an opposite side is referred to as "upper (above)."

Similarly, in the embodiments of the TAMR head, "X, Y and Z directions" are defined in some of the drawings as necessary. Here, the Z axis direction corresponds to the above-described "up and down directions", +Z side corresponds to a trailing side, and −Z side corresponds to a leading side. Moreover, the Y axis direction is a track width direction, and the X axis direction is a height direction.

Similarly, in descriptions of the TAMR head, "side surfaces" of a waveguide disposed in the TAMR head mean end surfaces that surround the waveguide other than end surfaces perpendicular to a propagation direction (−X direction) of light propagating through the waveguide. Therefore, either an "upper surface" or a "lower surface" of the waveguide in the descriptions of the TAMR head is one of the "side surfaces," and the "side surfaces" are surfaces which light propagating through the waveguide corresponding to a core totally reflects off.

Note, in the following descriptions, the TAMR head may be simply referred to as a magnetic recording head and magnetic head.

Figure 8:
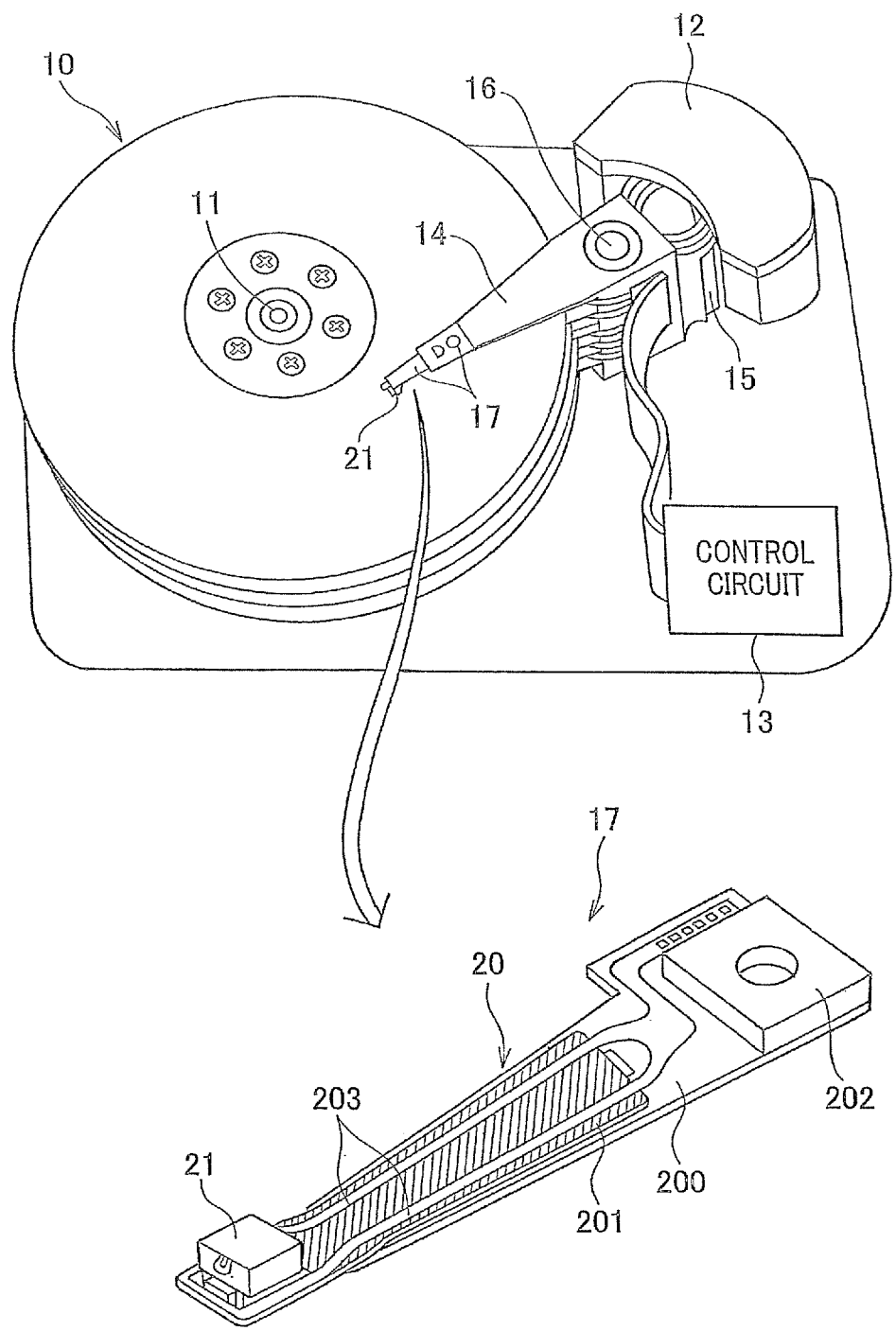
FIG. 8 is a perspective view schematically illustrating a configuration of a main portion of one embodiment of a magnetic recording/reproducing device and HGA of the present invention.

FIG. 8 is a perspective view schematically illustrating a configuration of a main portion of one embodiment of a magnetic recording/reproducing device and a head gimbal assembly (HGA). Herein, the perspective view of the HGA illustrates such that a side of the HGA that opposes the magnetic recording medium surface becomes an upper side.

A magnetic disk device illustrated in FIG. 8 as the magnetic recording/reproducing device includes a plurality of TAMR media 10, an assembly carriage device 12, head gimbal assemblies (HGA) 17 and a recording/reproducing and light emission control circuit 13. The TAMR media 10 as magnetic recording media rotate around a rotational shaft of a spindle motor 11. The assembly carriage device 12 is provided with a plurality of drive arms 14. The HGAs 17 each is attached to a tip portion of each of the drive arms 14 and has the TAMR head 21, which is a thin film magnetic head. The recording/reproducing and light emission control circuit 13 controls writing and reading operations of the TAMR head 21 and further controls a light emission operation of a laser diode, not illustrated in the drawings, to be a light source that generates laser light for TAMR In the present embodiment, the TAMR medium 10 is for perpendicular magnetic recording and has a configuration where a plurality of preferable films are laminated on a disk substrate as will be described below. The assembly carriage device 12 is a device for positioning the TAMR head 21 on tracks, which are formed on a magnetic recording layer of the TAMR medium 10 and on which recording bits are arrayed. In the assembly carriage device 12, the drive arms 14 are stacked in a direction along a pivot bearing shaft 16 and are angularly swingable by a voice coil motor (VCM) 15 centering around the pivot bearing shaft 16.

Note, the configuration of the magnetic disk device is not limited to the above-described configuration. For example, the magnetic disk device may include a singular of the TAMR medium 10, the drive arm 14, the HGA 17 and the TAMR head 21.

Further, in the HGA 17 according to FIG. 8, a suspension 20 includes a load beam 200, a flexure 201 that is firmly attached to the load beam 200 and has elasticity, and a base plate 202 provided on a base portion of the load beam 200. In addition, a wiring member 203 is provided on the flexure 201. The wiring member 203 is formed from a lead conductor and connection pads that are electrically connected to both sides of the lead conductor. The TAMR head 21 is firmly attached to the flexure 201 which is a tip part of the suspension 20 so as to oppose a surface of each of the magnetic disks 10 with a predetermined gap (flying height). Further, an end of the wiring member 203 is electrically connected to a terminal electrode of the TAMR head 21.

Note, the configuration of the suspension 20 as well is not limited to the above-described configuration. Though not illustrated, an IC chip for driving the head may be attached in the middle of the suspension 20.

Figure 9:
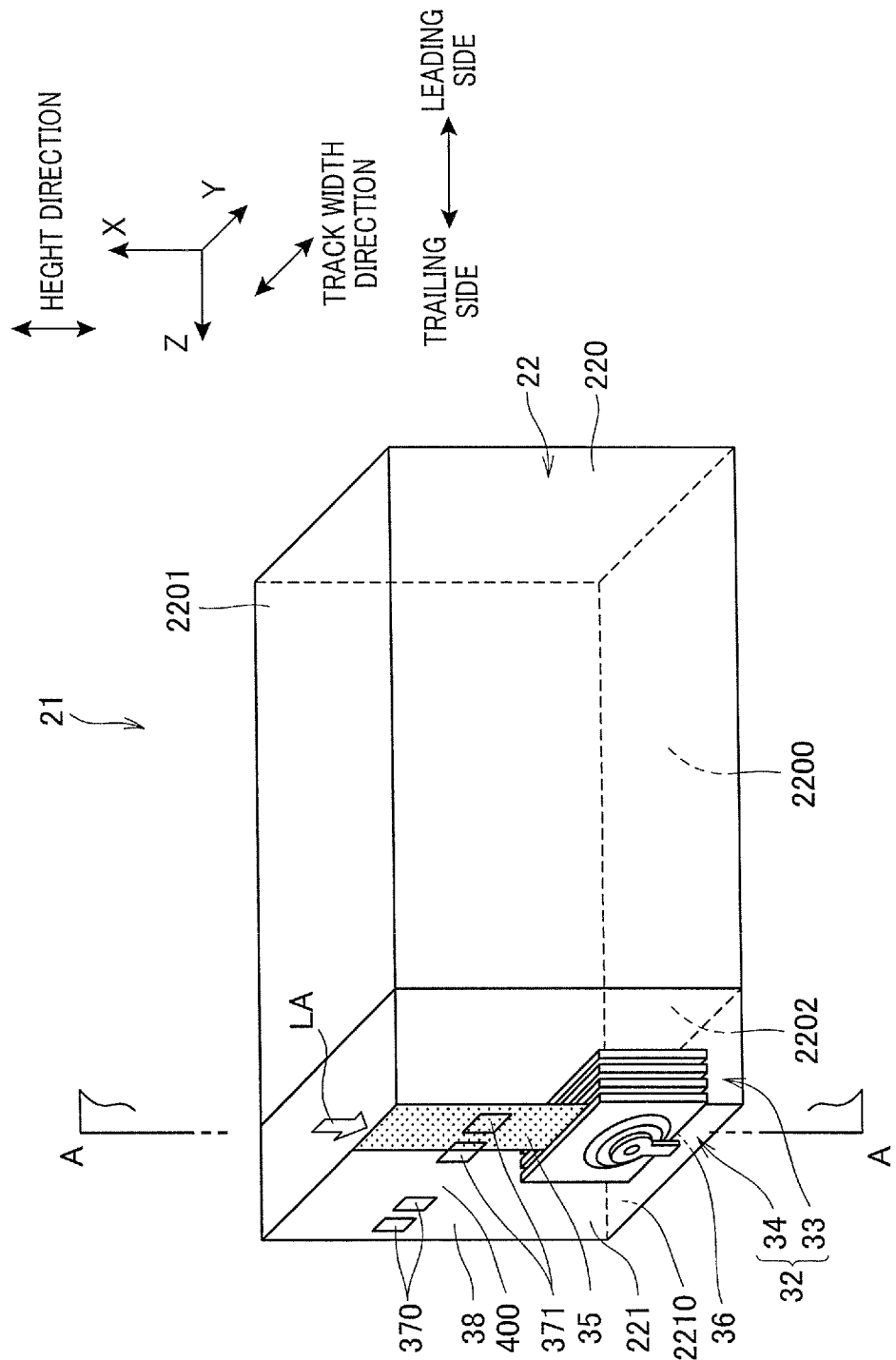
FIG. 9 is a perspective view schematically illustrating a configuration of a main portion of the TAMR head.

FIG. 9 is a perspective view illustrating one embodiment of the TAMR head 21.

Note, in the head of FIG. 9, illustration of a laser light generation device (light source unit) is omitted that is arranged at one end of a light waveguide in the x-direction and that emits laser light to be incident onto the light waveguide in the perpendicular direction. The irradiation state of the laser light to be incident in the perpendicular direction is simply repicted with the arrow LA.

The laser light generation device (light source unit), which is not illustrated, may be formed either by attaching a laser light generation device, which has previously formed at the external of the head, in the head, or by forming a laser light generation device in the head by thin film formation applying a film formation technology.

As illustrated in FIG. 9, the TAMR head 21 includes a slider 22.

The slider 22 is formed of ALTIC ($Al_2O_3$—TiC) or the like and is provided with a slider substrate 220 having an air bearing surface (ABS) 2200, and a head part 221. The ABS 2200 as a medium opposing surface is processed to obtain an appropriate flying height, and the head part 221 is formed on the element formation surface 2202 perpendicular to the ABS 2200.

The head part 221 formed on the element formation surface 2202 of the slider substrate 220 of the slider 22 includes a head element 32, a waveguide 35, a plasmon generator 36, a protective layer 38, a pair of terminate electrodes 370, and another pair of terminate electrodes 371. The head element 32 is configured with both an MR element 33 for reading out data from the magnetic disk and an electromagnetic transducer element 34 for writing data on the magnetic disk. The waveguide 35 is disposed for guiding the laser light from a laser diode provided on the light source unit (not illustrated) to an ABS side. The plasmon generator 36 forms a near-field light generator with the waveguide 35. The protective layer 38 is formed on the element formation surface 2202 so as to cover the MR element 33, the electromagnetic transducer element 34, the waveguide 35 and the plasmon generator 36. The pair of terminal electrodes 370 is exposed to an upper surface of the protective layer 38 and is electrically connected to the MR element 33. The other pair of terminal electrodes 371 is also exposed to the upper surface of the protective layer 38 and is electrically connected to the electromagnetic transducer element 34. The near-field light generator is configured with the plasmon generator and the waveguide.

The terminal electrodes 370 and 371 are electrically connected to the connection pad of the wiring member 203 provided to the flexure 201 (see FIG. 8).

Ends of the MR element 33, the electromagnetic transducer element 34 and the plasmon generator 36 reach a head part end surface 2210, which is the medium opposing surface of the head part 221. Here, the head part end surface 2210 and the ABS 2200 form the entire medium opposing surface of the TAMR head 21.

During the actual writing and reading, the TAMR head 21 hydro-dynamically flies on the surface of the rotating magnetic disk with a predetermined flying height. At this time, the end surfaces of the MR element 33 and the electromagnetic transducer element 34 oppose the surface of the magnetic recording layer of the magnetic disk with an appropriate magnetic spacing.

In this state, the MR element 33 performs the reading by sensing a data signal magnetic field from the magnetic recording layer, and the electromagnetic transducer element 34 performs the writing by applying a data signal magnetic field to the magnetic recording layer. At the time of the writing, the laser light irradiated from the laser diode of the light source unit is irradiated to the waveguide 35, the laser light propagating through the waveguide 35 is coupled with the plasmon generator 36 in a surface plasmon mode, as will be described below, to excite a surface plasmon at the plasmon generator 36.

This surface plasmon propagates through a propagative edge disposed in the plasmon generator 36, which will be described below, towards the head part end surface 2210 so that the near-field light is generated at the end part of the plasmon generator 36 on the side of the head part end surface 221. This near-field light reaches the surface of the magnetic disk to heat a part of the magnetic recording layer of the magnetic disk. As a result, anisotropic magnetic field (coercive force) at that part decreases to a value at which the writing becomes possible. Then, it becomes possible to perform the TAMR.

Figure 10:
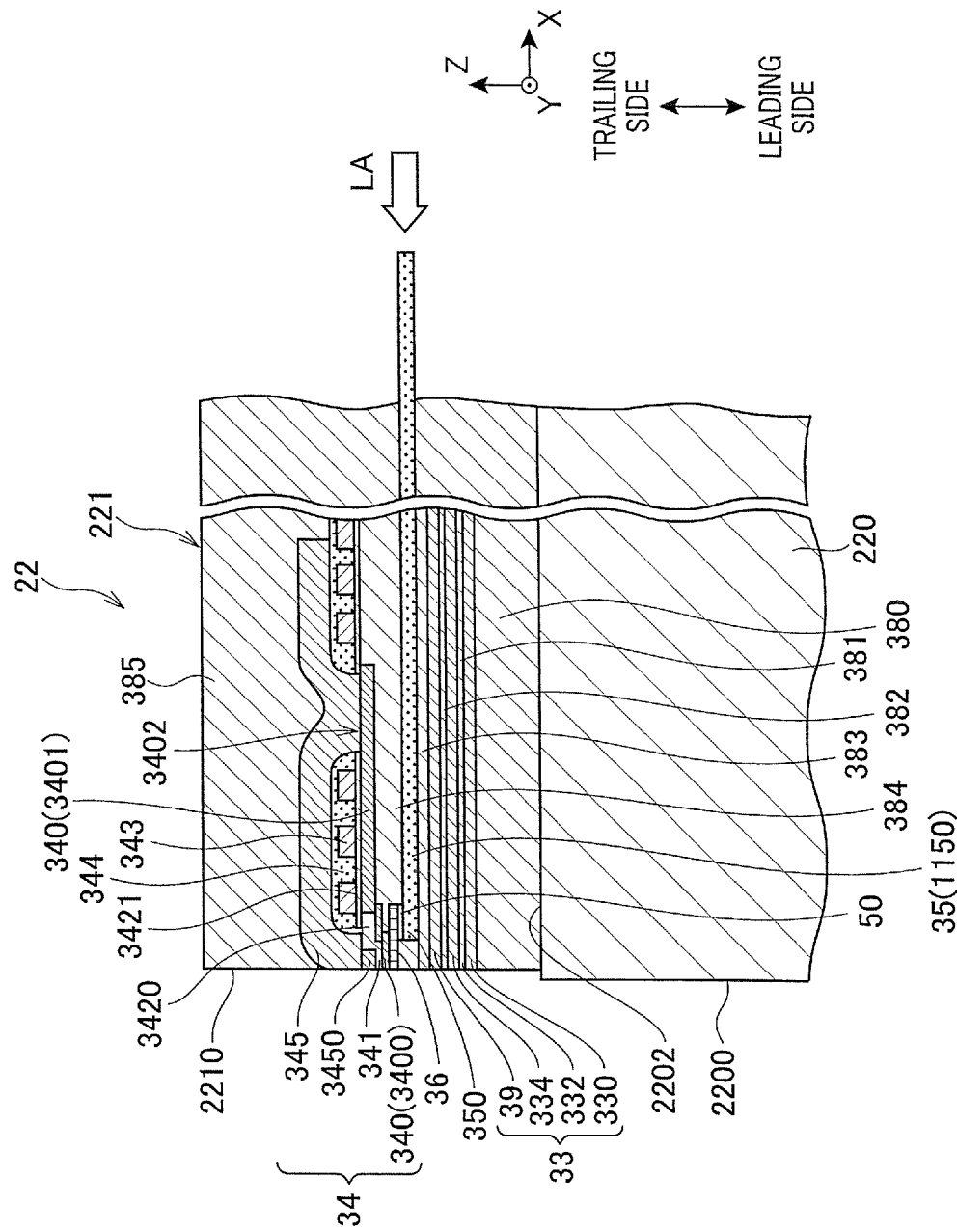
FIG. 10 is a cross-sectional view cut along the A-A plane of FIG. 9 that schematically illustrates the configuration of the main portion of the TAMR head.

FIG. 10 is a cross-sectional view cut along the A-A plane of FIG. 9 and schematically illustrates the configuration of the main portion of the TAMR head 21.

As illustrated in FIG. 10, the MR element 33 includes an MR multilayer body 332, and a pair of a lower shield layer 330 and an upper shield layer 334 that is arranged at a position sandwiching the MR multilayer body 332 and an insulating layer 381, and is formed on an insulating layer 380 formed on the element formation surface 2202. The upper and lower shield layers 334 and 330 prevent the MR multilayer body 332 from being affected by external magnetic fields which turn to noise.

The upper and lower shield layers 334 and 330 are magnetic layers with a thickness of approximately 0.5-3 μm that are formed of a soft magnetic material by, for example, a frame plating method, a spattering method, or the like. The soft magnetic material is, for example, NiFe (permalloy), FeSiAl (sendust), CoFeNi, CoFe, FeN, FeZrN, CoZrTaCr or the like, or a multilayer film formed by these materials The MR multilayer body 332 is a magnetically sensitive part that senses the signal magnetic field using the MR effect and may be any of, for example, a current in plane-giant magnetoresistive (CIP-GMR) multilayer body that uses a CIP-GMR effect, a current perpendicular to plane-giant magnetoresistive (CPP-GMR) multilayer body that uses a CIP-GMR effect, and a tunnel-magnetoresistive (TMR) multilayer body that uses a TMR effect.

Even when any of the multilayer bodies is used, the MR multilayer body 332 using such MR effects can sense the signal magnetic field from the magnetic disk with high sensitivity. When the MR multilayer body 332 is a CPP-GMR multilayer body or a TMR multilayer body, the upper and lower shield layers 334 and 330 function as electrodes as well. On the other hand, when the MR multilayer body 332 is a CIP-GMR multilayer body, insulating layers are provided respectively between the MR multilayer body 332 and the lower shield layer 334 and between the MR multilayer body 332 and the upper shield layer 330. Moreover, an MR lead layer that is electrically connected to the MR multilayer body 332 is provided.

For example, when the MR multilayer body 332 is a TMR multilayer, the MR multilayer body 332 has a structure in which a antiferromagnetic layer, a magnetization pinned layer, a tunnel barrier layer, and a magnetization free layer are sequentially laminated. The antiferromagnetic layer has a thickness of approximately 5-15 nm and is formed of, for example, IrMn, PtMn, NiMn, RuRhMn or the like. The magnetization pinned layer has a structure in which two ferromagnetic layers formed of CoFe or the like sandwich a nonmagnetic metal layer formed of Ru or the like and has a magnetization direction that is pinned by the antiferromagnetic layer. The tunnel barrier layer is formed of a nonmagnetic dielectric material which a metal film formed of Al, AlCu or the like having a thickness of approximately 0.5-1 nm is oxidized by oxygen introduced into a vacuum device or by natural oxidation. The magnetization free layer is configured with a double layer film formed by a layer of CoFe or the like having a thickness of approximately 1 nm and a layer of NiFe or the like having a thickness of approximately 3-4 nm, which are ferromagnetic materials, and achieves tunnel exchange coupling with the magnetization pinned layer with the tunnel barrier layer therebetween.

Also, as illustrated in FIG. 10, the electromagnetic transducer element 34 is for perpendicular magnetic recording and includes a main pole layer 340, a gap layer 341, a writing coil layer 343, a coil insulating layer 344 and a light shield layer 345.

The main pole layer 340 is formed on an insulating layer 384 formed of an insulating material such as $Al_2O_3$ (alumina) or the like, and is a waveguide for guiding a magnetic flux generated by applying a writing current to the writing coil layer 343 to the magnetic recording layer (perpendicular magnetization layer) of the magnetic disk where the writing is performed as focusing the magnetic flux.

The main pole layer 340 has a structure in which the main pole 3400 and the main pole main body part 3401 are sequentially laminated. Here, the main pole 3400 has a first main pole part 3400a that reaches the head part end surface 2210 and has a small width $W_p$ (see FIG. 9) in the track width direction, and a second main pole part 3400b that is disposed on the first main pole part 3400a and is positioned rearward (+X side) with respect to the first main pole part 3400a.

As described above, the first main pole part 3400a has the small width $W_p$, and this enables to generate a minute writing magnetic field and to set the track width to a micro-value that is applicable to higher recording density.

The main pole 3400 is formed from a soft magnetic material having a higher saturation magnetic flux density than the main pole main body part 3401, and is formed from a soft magnetic material such as, for example, FeNi, FeCo, FeCoNi, FeN, FeZrN or the like, which are iron-based alloy materials having Fe as a main component. The thickness of the first main pole part 3400a is, for example, approximately 0.1-0.8 μm.

The gap layer 341 forms a gap for magnetically separating the main pole layer 340 and the light shield layer 345 in the vicinity of the head end surface 300. The gap layer 341 is configured with a nonmagnetic insulating material such as $Al_2O_3$ (alumina), $SiO_2$ (silicon dioxide), AlN (aluminum nitride), diamond-like carbon (DLC) or the like, or a nonmagnetic conductive material such as Ru (ruthenium) or the like. The thickness of the gap layer 341 defines the gap between the main pole layer 340 and the light shield layer 345, and is, for example, approximately 0.01-0.5 μm.

The writing coil layer 343 is formed on the insulating layer 3421 of an insulating material such as $Al_2O_3$ (alumina) so as to pass through at least between the main pole layer 340 and the light shield layer 345 during one turning, and has a spiral structure where the writing coil layer 343 winds around a back contact part 3402 as the center.

The writing coil layer 343 is formed from a conductive material such as, for example, Cu (copper) or the like. Herein, the writing coil insulating layer 344, formed of an insulating material such as a thermally cured photoresist or the like, covers the writing coil layer 343 to electrically insulate the writing coil layer 343 from the main pole layer 340 and the light shield layer 345.

The writing coil layer 343 is configured with one layer in the present embodiment; however, may be configured with two or more layers or a helical coil. Furthermore, the number of windings is not limited to the number illustrated in FIG. 10, and can be set 2-7 turns, for example.

The light shield layer 345 reaches the head part end surface 2210, and functions as a waveguide for a magnetic flux that returns from a soft magnetic under layer provided below the magnetic recording layer (perpendicular magnetization layer) of the magnetic disk. The thickness of the light shield layer 345 is, for example, approximately 0.5-5 μm. Also, a portion of the light shield layer 345 that opposes the main pole layer 340 reaches the head part end surface 2210 as well, and forms a trailing shield 3450 that intakes a spread magnetic flux generated from the main pole layer 340.

In the present embodiment, the trailing shield 3450 as well as the insulating layer 3420 and the main pole main body part 3401 is planarized, and has a larger width in the track width direction than not only the first main pole part 3400a but also the main pole main body part 3401. By disposing such trailing shield 3450, a magnetic field gradient between an end part of the trailing shield 3450 and the first main pole part 3400a becomes steeper. As a result, the signal output jitter is reduced so that the error rate during reading can be lowered. Also, the light shield layer 345 is formed of a soft magnetic material, and particularly the trailing shield 3450 is formed of an iron-based alloy material, etc., which is similar to NiFe (permalloy) or the main pole 3400, having high saturation magnetic flux density.

Also, as illustrated in FIG. 10, the waveguide 35 and the plasmon generator 36 are disposed between the MR element 33 and the electromagnetic transducer element 34, and form a near-field light generator, which is an optical system, in the head part 221.

Herein, the waveguide 35 is formed parallel to the element formation surface 2202, and is elongated to an end surface 350 on the head part end surface 2210 side.

In addition, a portion of the upper surface (side surfaces) of the waveguide 35 and a portion of a lower surface of the plasmon generator 36 (including a propagative edge 360 (FIG. 11)) oppose each other with a predetermined gap. A part that is sandwiched between those portions forms a buffer portion 50 that has a lower refractive index than the refractive index of the waveguide 35.

The buffer portion 50 functions to couple the laser light that propagates through the waveguide 35 to the plasmon generator 36 in the surface plasmon mode. Note, the buffer portion 50 may be a part of an insulating layer 384, which is a part of the protective layer 38, or may be another layer provided separately from the insulating layer 384. Further description regarding the waveguide 35, the plasmon generator 36 and the buffer portion 50 are given with reference to FIG. 11.

Also in the present embodiment, an interelement shield layer 39 sandwiched between insulating layers 382 and 383 is disposed between the MR element 33 and the electromagnetic transducer element 34 (waveguide 35). The interelement shield layer 39 functions to shield the MR element 33 from the magnetic field generated from the electromagnetic transducer element 34, and may be also formed of the soft magnetic material which is the same as the upper and lower shield layers 334 and 330. Note, the interelement shield layer 39 is not necessarily required, and a configuration without the interelement shield layer 39 is also applicable. Note, a bucking coil part may be also formed between the interelement shield layer 39 and the waveguide 35.

The bucking coil part generates a magnetic flux to cancel a magnetic flux loop generated from the electromagnetic transducer element 34 and passing through the upper and lower shield layers 334 and 330 of the MR element 33, and attempts to suppress wave area adjacent track eraser (WATE) phenomena, which is unnecessary writing operation or deletion operation to the magnetic disk.

Figure 11:
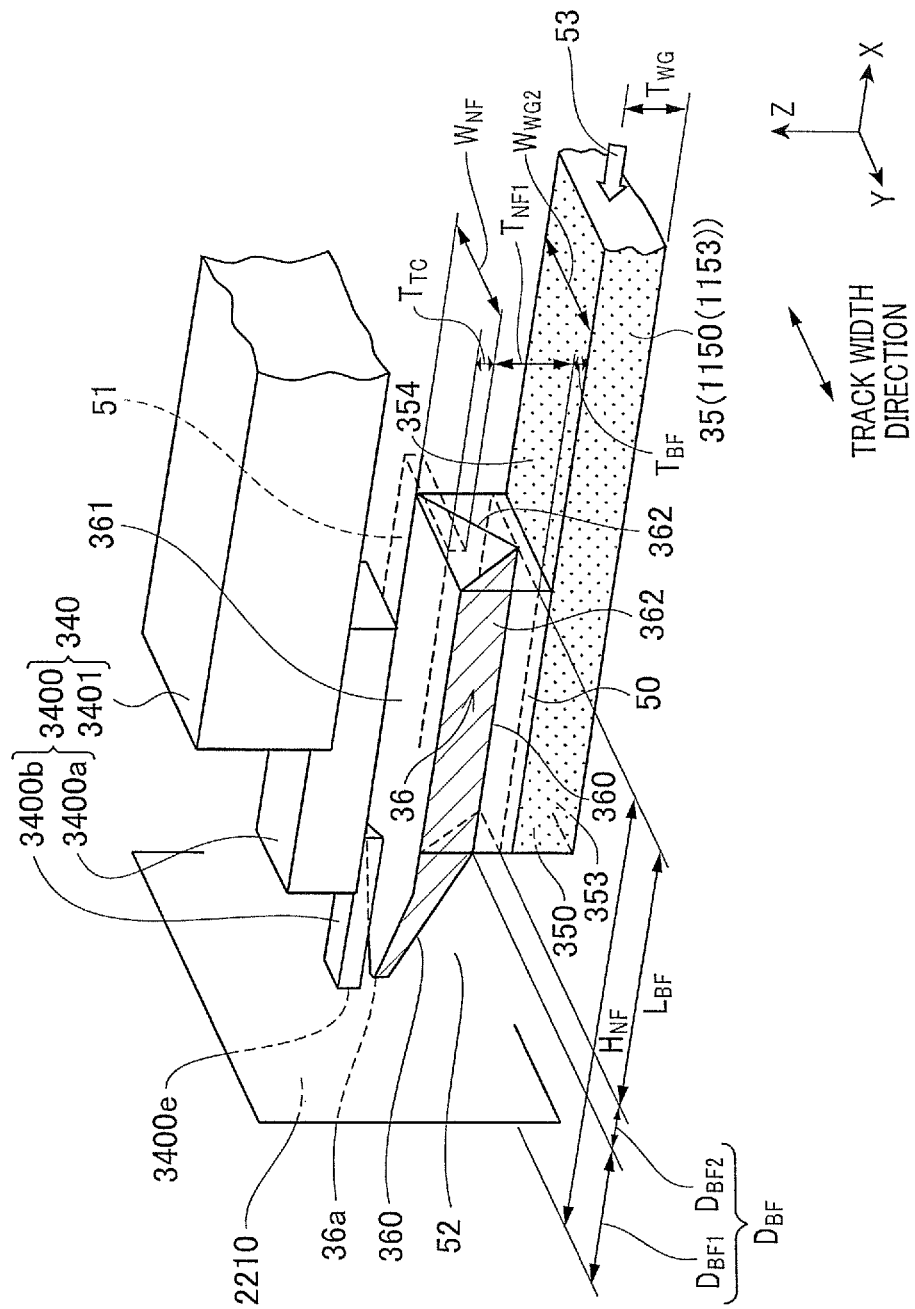
FIG. 11 is a perspective view schematically illustrating a configuration of a waveguide, a plasmon generator and a main pole layer.

Note, in the configuration of the head illustrated in FIGS. 10 and 11, in a region where the waveguide 35 and the plasmon generator 36 with each other, it is required that an oscillation direction of an electric field of the laser light is perpendicular (the z-direction: polarized light in TM mode).

FIG. 11 is a perspective view schematically illustrating the configuration of the waveguide 35, the plasmon generator 36 and the main pole layer 340. In FIG. 11, the head part end surface 2210 including a portion from which the writing magnetic field and the near-field light are radiated to the magnetic recording medium is positioned on the left side.

As illustrated in FIG. 11, the waveguide 35 for propagating laser light 53 for near-field light generation, and the plasmon generator 36 provided with the propagative edge 360, which is an edge through which a surface plasmon to be excited by the laser light 53 propagates, are disposed.

Further, the buffer portion 50 is a portion sandwiched by a portion of the side surface 354 of the waveguide 35 and a portion of lower surfaces 362 including the propagative edge 360 of the plasmon generator 36 that opposes the portion of the side surface 354. Namely, one portion of the propagative edge 360 is covered by the buffer portion 50.

The buffer portion 50 functions to couple the laser light 53 with the plasmon generator 36 in the surface plasmon mode. Herein, side surfaces of the waveguide 35 refers end surfaces surrounding the waveguide 35 other than the end surface 350 on the side of the head part end surface 2210 perpendicular to the propagation direction (−X direction) of the laser light 53 and an end surface (not illustrated) on an opposite side thereto. The side surfaces are the surfaces which the laser light 53 propagating through the waveguide 35, which corresponds to a core, may totally reflect off.

Note, in the present embodiment, the side surface 354 of the waveguide 35 that partially contacts the buffer portion 50 is the upper surface of the waveguide 35. Also, the buffer portion 50 either may be either one part of the protective layer 38 (see FIG. 9), or may be another layer that is provided separately from the protective layer 38.

The plasmon generator 36 is provided further with a near-field light generator end surface 36a that reaches the head part end surface 2210. The near-field light generator end surface 36a is closely disposed to an end surface 3400e of the main pole 3400 that reaches the head part end surface 2210. Also, the propagative edge 360 is elongated from a portion that is covered by the buffer portion 50 to the near-field light generator end surface 36a, and functions to propagate the surface plasmon excited by the laser light 53 to the near-field light generator end surface 36a. At the portion, the propagative edge 360 is coupled with the laser light 53 in the surface plasmon mode.

Herein, the portion of the propagative edge 360 on the head part end surface 2210 side has a linear shape or curved line shape that is elongated so as to get close to the end surface 361 on the opposite side to the propagative edge 360 of the plasmon generator 36 as getting close to the near-field light generator end surface 36a. Note, an angle of the propagative edge 360 may be rounded to prevent the phenomena which the surface plasmon escapes from the propagative edge 360. At this time, the curvature radius of the rounded angle is, for example, 5-500 nm.

Also in the present embodiment, the plasmon generator 36 has a shape tapered toward the near-field light generator end surface 36a in the height direction (Z-axis direction) in the vicinity of the head part end surface 2210.

Also, the plasmon generator 36 has a triangular shaped cross section in the XY plane, and specifically has a predetermined triangular shape in the vicinity of the head part end surface 2210. As a result, in the present embodiment, the near-field light generator end surface 36a has a triangular shape of which one apex is an end of the propagative edge 360 that reaches the end surface 36a (see FIG. 12). Herein, the surface plasmon propagating at the propagative edge 360 reaches the near-field light generator end surface 36a to generate the near-field light from the near-field light generator end surface 36a.

The waveguide 35 and the buffer portion 50 are disposed on the −Z side (lower side of the drawing) of the plasmon generator 36, which is on the opposite side to the main pole 3400. As a result, the propagative edge 360 covered by the buffer portion 50 as well is positioned on the opposite side to the main pole 3400. In such configuration, even in a state where a distance between the end surface 3400e of the main pole 3400 for generating the writing magnetic field and the near-field light generator end surface 36a for generating near-field light is sufficient, preferably 100 nm or less, the waveguide 35 can be sufficiently separated from the main pole 3400 and the main pole main body part 3401. As a result, a situation can be prevented where the laser light 53 is partially absorbed by the main pole 3400 and the main pole main body part 3401 formed from a metal so as to reduce a quantity of light to be converted to near-field light.

As illustrated in FIG. 11, the waveguide 35 may be formed in a rectangular prism shape, but also the width of a portion of the waveguide 35 on the head part end surface 2210 side may be narrowed in the track width direction (the Y-axis direction). The width $W_{WG2}$ in the track width direction (the Y-axis direction) at a portion on the end surface 350 side can be set to, for example, approximately 0.3-100 m, and the thickness $T_{WG}$ (the Z-axis direction) can be set to, for example, 0.1-4 μm. The height (length) (in the X-axis direction) can be set to, for example, 10-300 μm.

Also, side surfaces of the waveguide 35, which are an upper surface 354, a lower surface 353, and both side surfaces 351 in the track width direction (the Y-axis direction) excluding a part contacting the buffer portion 50, contact the protective layer 38 (see FIG. 9). Herein, the waveguide 35 is configured with a material, which is formed using, for example, a sputtering method or the like, having a refractive index $n_{WG}$ that is higher than a refractive index $n_{OC}$ of the configuration material of the protective layer 38. For example, when the wavelength $\lambda_L$ of the laser light is 633 nm and the protective layer 38 is formed of $SiO_2$ (n=1.5), the waveguide 35 may be formed of $Al_2O_3$ (n=1.63). Further, when the protective layer 38 is formed in $Al_2O_3$ (n=1.63), the waveguide 35 may be formed of $SiO_xN_Y$ (n=1.7-1.85), $Ta_2O_5$ (n=2.16), $Nb_2O_5$ (n=2.33), TiO (n=2.3-2.55) or $TiO_2$ (n=2.3-2.55). When the waveguide 35 is configured with such materials, the propagation loss of the laser light 53 is kept low because of an excellent optical characteristic of the material itself. Further, the waveguide 38 achieves the function as a cladding while the waveguide 35 functions as the core, and therefore total reflection conditions of all of the side surfaces are prepared. Therefore, greater laser light 53 reaches the position of the buffer portion 50, resulting in the improvement of the propagation efficiency of the waveguide 35.

The plasmon generator 36 is preferably formed of a conductive material such as metals, for example, Pd, Pt, Rh, Ir, Ru, Au, Ag, Cu or Al, or an alloy containing several these materials. Also, the width $W_{NF}$ in the track width direction (the Y-axis direction) at the end surface 361 of the plasmon generator 36 can be set to be sufficiently smaller than the wavelength of the laser light 53, for example, approximately 10-100 μm, and the thickness $T_{NF1}$ (the Z-axis direction) can be set to be sufficiently smaller than the wavelength of the laser light 53, for example, approximately 10-100 μm. The length (height) (in the X-axis direction) $H_{NF}$ can be set to, for example, approximately 0.8-6.0 μm.

The buffer portion 50 is formed of a dielectric material having a refractive index $n_{BF}$ that is lower than the refractive index $n_{WG}$ of the waveguide 35. For example, when the wavelength $\lambda_L$ of the laser light is 633 nm and the waveguide 35 is formed of $Al_2O_3$ (n=1.63), the buffer portion 50 may be formed of $SiO_2$ (n=1.46).

Also, when the waveguide 35 is formed of $Ta_2O_5$ (n=2.16), the buffer portion 50 may be formed of $SiO_2$ (n=1.46) or $Al_2O_3$ (n=1.63). In this case, the buffer portion 50 can be formed as a portion of the protective layer 38 (FIG. 6) that functions as the cladding formed of $SiO_2$ (n=1.46) or $Al_2O_3$ (n=1.63).

Also, the length (in the X-axis direction) of the buffer portion 50, which is the length $L_{BF}$ of coupling portion of the waveguide 35 and the plasmon generator 36, is preferably 0.5-5 μm. The thickness $T_{BF}$ (in the Z-axis direction) of the buffer portion 50 is preferably 10-200 nm. The length $L_{BF}$ and the thickness $T_{BF}$ of the buffer portion 50 are important parameters for obtaining appropriate excitation and propagation of the surface plasmon.

Also, an end of the buffer portion 50 on the head part end surface 2210 side is separated by the distance $D_{BF}$ from the head part end surface 2210 in the X-axis direction. A propagation distance of the surface plasmon is adjusted by the distance $D_{BF}$.

As also illustrated in FIG. 11, at a portion on the head part end surface 2210 side between the plasmon generator 36 and the first main pole part 3400a, a thermal conductive layer 51 may be disposed. The thermal conductive layer 51 is formed of an insulating material, which has a higher thermal conductivity compared to the protective layer 38 (see FIG. 9), such as, for example, AlN, SiC, DLC or the like. Disposition of the thermal conductive layer 51 allows heat generated when the plasmon generator 36 generates near-field light to partially escape via the thermal conductive layer 51 to the main pole 3400 and the main pole main body part 3401. In other words, the main pole 3400 and the main pole main body part 3401 can be used for heat sinks. As a result, an excessive temperature increase of the plasmon generator 36 can be suppressed, and unnecessary projections of the near-field light generator end surface 36a and a significant decrease in an optical-power efficiency of the plasmon generator 36 can be prevented.

The thickness $T_{TC}$ of the thermal conductive layer 51 corresponds to the gap $D_{N-P}$ (see FIG. 9) between the near-field light generator end surface 36a and the end surface 3400e of the main pole 3400, which are on the head part end surface 2210, and is set to a sufficiently small number, which is 100 nm or less.

Further, the refractive index $n_{IN2}$ of the thermal conductive layer 51 is set to be the same as the refractive index $n_{IN1}$ of an insulating layer 52 that covers the propagative edge 360 of the plasmon generator 36 or less. In other words, the propagative edge 360 of the plasmon generator 36 is covered by a material having the same refractive index as the refractive index $n_{IN2}$ of a material covering the end surface 361 on the opposite side to the propagative edge 360, or the refractive index $n_{IN1}$ that is higher than the refractive index $n_{IN2}$.

Therefore, it becomes possible for the surface plasmon to propagate on the propagative edge 360 in stable condition. Actually, it is preferred to be the refractive index $n_{IN1} \geq$ the refractive index $n_{IN2} \times 1.5$.

As also illustrated in FIG. 11, the main pole layer 340 includes the main pole 3400 and the main pole main body part 3401 as described above. Herein, the main pole 3400 includes the first main pole part 3400a including the end surface 3400e that reaches the head part end surface 2210 and the second main pole part 3400b of which an end part on the head part end surface 2210 side overlaps a portion of the first main pole part 3400a that is on the opposite side to the head part end surface 2210.

Also, the end part of the main pole main body part 3401 on the head part end surface 2210 side overlaps the portion of the second main pole part 3400b on the opposite side to the head part end surface 2210. As described above, the portion of the main pole layer 340 on the head part end surface 2210 side is inclined toward the element formation surface 2202 (see FIG. 10) as getting close to the head part end surface 2210 so as to get close to the end part of the plasmon generator 36 on the head part end surface 2210 side. Therefore, with sufficient elongation of the main pole layer 340 from the waveguide 35, the end surface 3400e of the main pole 3400 can be disposed in sufficiently close to the near-field light generator end surface 36a.

Figure 12:
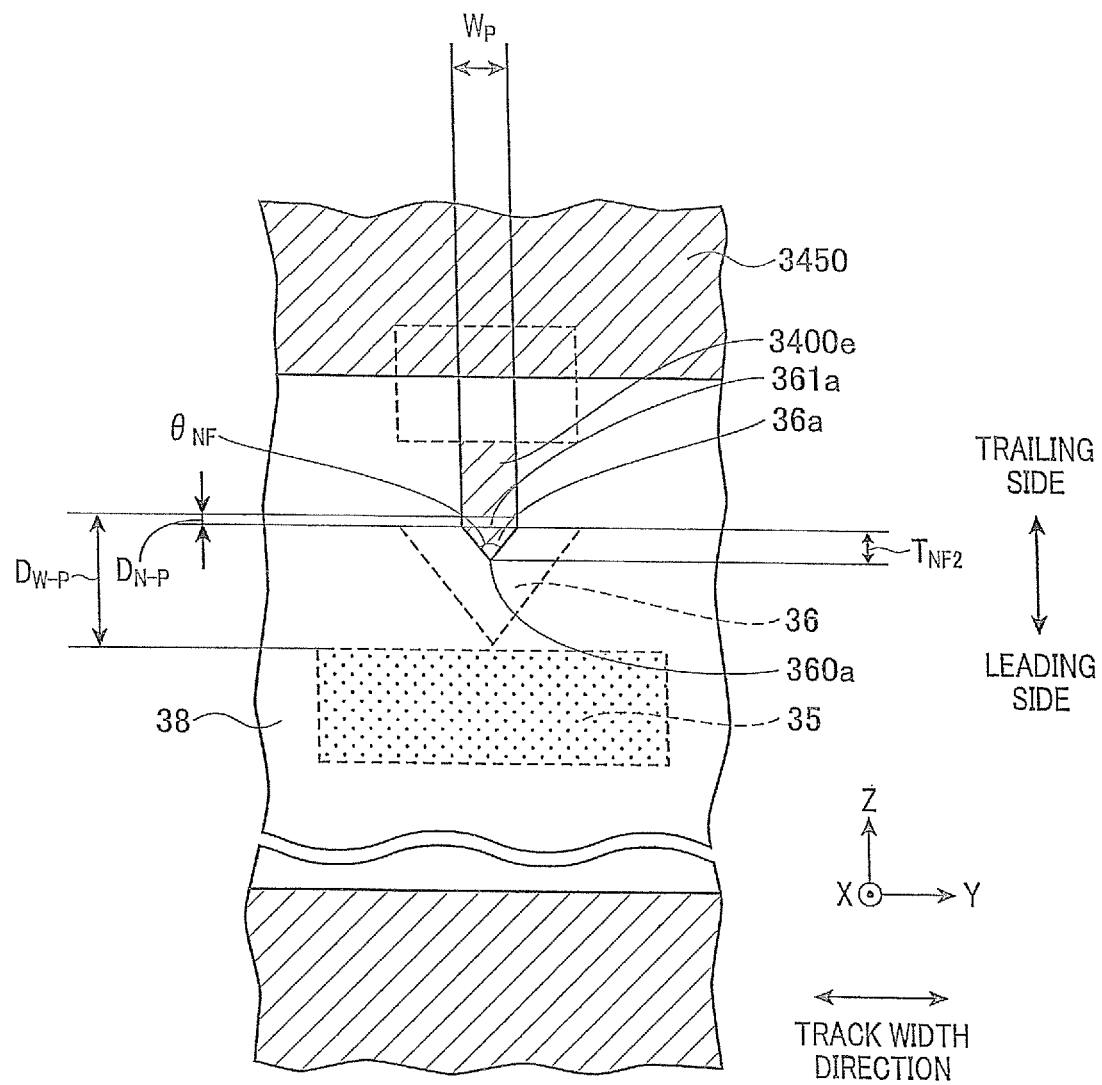
FIG. 12 is a plan view illustrating shapes of end surfaces of the plasmon generator and an electromagnetic transducer element on a head part end surface.

FIG. 12 is a plan view illustrating shapes of the end surfaces of the plasmon generator 36 and the electromagnetic transducer element 34 on the head part end surface 2210.

As illustrated in FIG. 12, in the electromagnetic transducer element 34, the main pole 3400 (the first main pole part 3400a) and the light shield layer 345 (the trailing shield 3450) are reached to the head part end surface 2210. In the above description, the shape of the end surface 3400e of the main pole 3400 on the head part end surface 2210 is, for example, a rectangular, squire, or trapezoidal shape.

Herein, the above-described width $W_P$ is the length of an edge of the end surface 3400e of the main pole 3400 on the leading side, and defines the width of a track formed on the magnetic recording layer of the magnetic disk. The width $W_P$ is, for example, approximately 0.05-0.5 µm.

Also, on the head part end surface 2210, the near-field light generator end surface 36a of the plasmon generator 36 is in the vicinity of the end surface 3400e of the main pole 3400 and is positioned on the leading side (−Z side) of the end surface 3400e. Herein, referring to the gap between the near-field light generator end surface 36a and the end surface 3400e as $D_{N-P}$, the gap $D_{N-P}$ is a sufficiently small value that is 100 nm or less, and is preferably 20 nm or more in specific and is more preferably 30 nm or more.

In the TAMR of the present embodiment, since the near-field light generator end surface 36a is a main heating function part and the end surface 3400e is the writing part, writing magnetic field having sufficient large gradient can be applied to a sufficiently-heated portion of the magnetic recording layer of the TAMR medium. Therefore, the stable writing operation by thermal assist can be certainly performed.

Further, in the present embodiment, the near-field light generator end surface 36a on the head part end surface 2210 is shaped in an isosceles triangle where the base 361a is on the trailing side (+Z side) and the end 360a of the propagative edge 360 is an apex on the leading side (−Z side). The height (the height of the plasmon generator 36 on the head part end surface 2210) $T_{NF2}$ of the near-field light generator end surface 36a is preferably nm or less, and more preferably 20 nm or less. Therefore, a light emission position of the near-field light on the near-field light generator end surface 36a is in the vicinity of the base 361a on the trailing side, and is further close to the end surface 3400e of the main pole 3400.

Also, an apex angle $\theta_{NF}$ at the apex 360a of the isosceles triangle is preferably 60-130 degrees, and is more preferably 80-110 degrees. By adjusting the apex angle $\theta_{NF}$, the light emission position of the near-field light within the near-field light generator end surface 36a can be positioned on the trailing side.

Further, referring to the gap between the waveguide 35 and the main pole 3400 as $D_{W-P}$ and upon setting the gap $D_{N-P}$ to the extremely small value as described above, the gap $D_{W-P}$ can be set sufficient large. In other words, according to the configuration illustrated in FIG. 12, the waveguide 35 can be sufficiently separated from the main pole 3400 and the main pole main body part 3401. As a result, a situation can be prevented where the laser light is partially absorbed by the main pole 3400 and the main pole main body part 3401 formed from a metal so as to reduce a quantity of light to be converted to near-field light.

Figure 13:
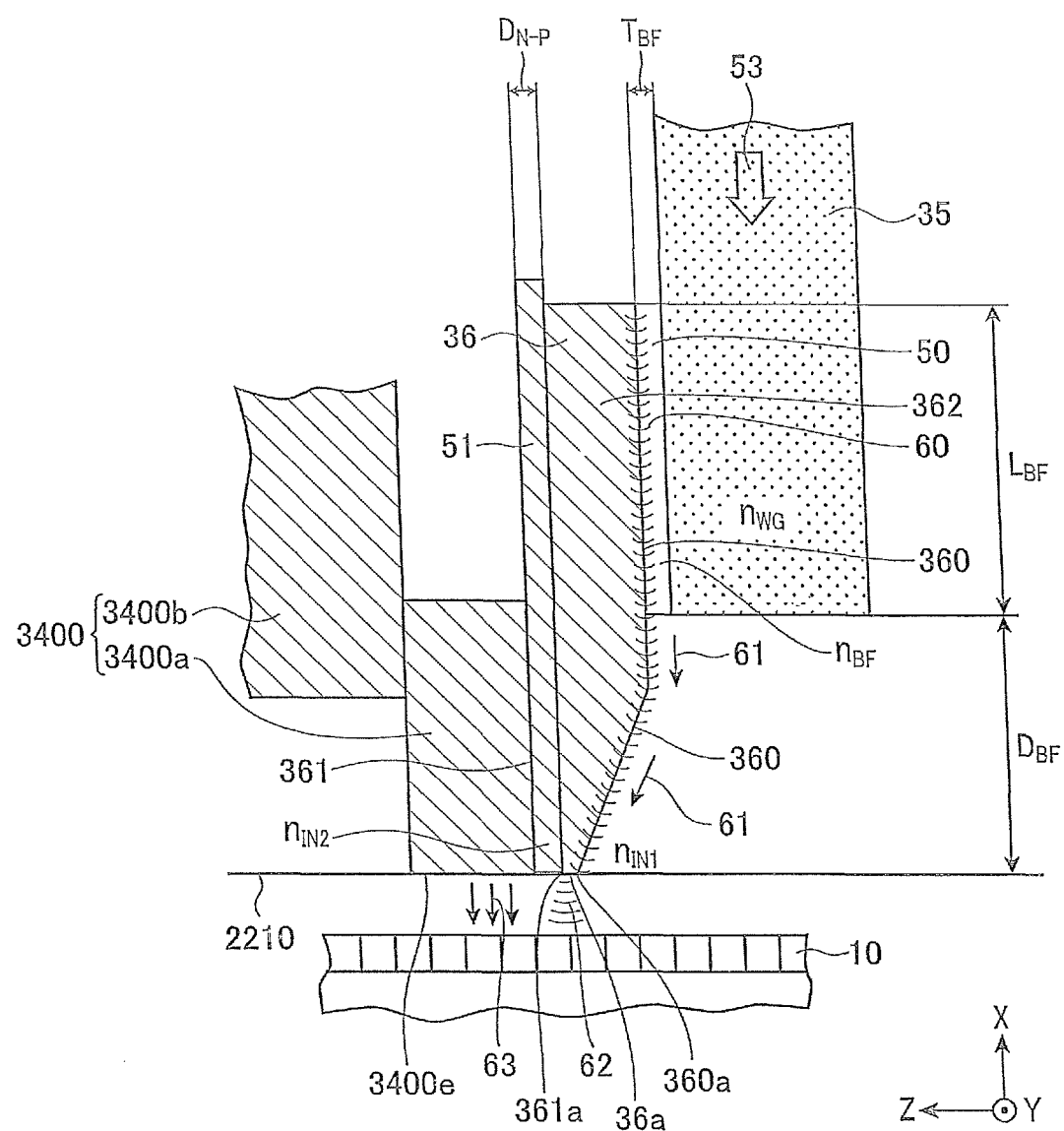
FIG. 13 is a schematic view for explaining TAMR using a surface plasmon mode.

FIG. 13 is a schematic view for explaining TAMR using a surface plasmon mode.

As illustrated in FIG. 13, at the time of the writing to the magnetic recording layer of the TAMR medium 10 by the electromagnetic transducer element 34, the laser light 53 radiated from the laser diode of the light source unit 23 initially propagates through the waveguide 35. Next, the laser light 53 that has propagated to the vicinity of the buffer portion 50 couples with the optical configuration of the waveguide 35 having the refractive index $n_{WG}$, the buffer portion 50 having the refractive index $n_{BF}$, and the plasmon generator 36 made of a conductive material such as a metal or the like so as to excite the surface plasmon mode at the propagative edge 360 of the plasmon generator 36. In other words, the laser light 53 couples to the plasmon generator 36 in the surface plasmon mode.

Actually, because of an optical interface condition between the waveguide 35 that is the core and the buffer portion 50, the evanescent light is excited in the buffer portion 50. Next, the surface plasmon mode is induced by coupling the evanescent light with fluctuation of charges excited on a metal surface (the propagative edge 360) of the plasmon generator 36 to excite the surface plasmon. Note, to be precise, since the surface plasmon that is elementary excitation couples with electromagnetic wave in this system, what to be excited is surface plasmon polariton. However, hereinafter, the surface plasmon polariton is abbreviated and is referred to as surface plasmon as well.

Since the propagative edge 360 is located in the closest position to the waveguide within the inclined lower surfaces 362 of the plasmon generator 36 and also is the angle part that allows electric field to be easily focused, the surface plasmon is more likely to be excited. At this point, in the induction of the surface plasmon mode, the refractive index $n_{BF}$ of the buffer portion 50 is set to be smaller than the refractive index $n_{WG}$ of the waveguide 35 ($n_{BF} < n_{WG}$). Further, as described above, the induction of the surface plasmon mode can be achieved by properly selecting the height (in the X-axis direction) of the buffer portion 50, which is the length $L_{BF}$ of the coupling portion of the waveguide 35 and the plasmon generator 36, and the thickness $T_{BF}$ (in the Z-axis direction) of the buffer portion 50.

In the induced surface plasmon mode, the surface plasmon 60 is excited on the propagative edge 360 of the plasmon generator 36 and propagates on the propagative edge 360 along the direction of an arrow 61. The propagation of the surface plasmon 60 can be achieved under either a condition that the propagative edge 360 of the plasmon generator 36 has the same refractive index as the refractive index $n_{IN2}$ of the material covering the end surface 361 that is on the opposite side to the propagative edge 360 or another condition that the propagative edge 360 is covered by a material having the refractive index $n_{IN1}$ that is higher than the refractive index $n_{IN2}$. Actually, it is preferred to be the refractive index $n_{IN1} \geq$ the refractive index $n_{IN2} \times 1.5$. Also in FIG. 13, the refractive index $n_{IN2}$ of the thermal conductive layer 51 is set to be smaller than the refractive index $n_{IN1}$ of the insulating layer 52 covering the propagation surface 360 of the near-field light generating layer 36.

By the surface plasmon 60 propagating as described above, the surface plasmon 60, which is electric field, is focused on the near-field light generator end surface 36a that reaches the head part end surface 2210 and has the apex 360a which is a destination of the propagative edge 360.

As a result, near-field light 62 is generated from the near-field light generator end surface 36a. The near-field light 62 is irradiated toward the magnetic recording layer of the TAMR medium 10 and is reached to the surface of the TAMR medium 10 to heat the magnetic recording layer portion of the TAMR medium 10. Thereby, an anisotropy magnetic field (coercive force) of the portion is reduced to the value that allows to perform the writing. Immediately after that, the writing is performed by applying the writing magnetic field 63 generated from the main pole 3400 to the portion. By taking such steps, it becomes able to perform TAMR.

Herein, as described above, by adjusting the shape and size of the near-field light generator end surface 36a on the head part end surface 2210, the light emission position of the near-field light 62 on the near-field light generator end surface 36a can be positioned on the trailing side (base 361a side) that is closer to the first main pole part 3400a. Thereby, the writing magnetic field having the sufficiently large gradient can be applied to the sufficiently-heated portion of the magnetic recording layer of the TAMR medium 10. As a result, the stable writing operation by thermal assist can be certainly performed.

Also in the above-described plasmon generator 36, the propagative edge 360 on which the surface plasmon propagates is a propagation region having an extremely narrow width in the track width direction. Also, in the present embodiment, a cross section of the plasmon generator 36 in the YZ plane has a triangular shape and has a predetermined triangular shape particularly in the vicinity of the head part end surface 2210. Accordingly, when the near-field light generator end surface 36a that is appeared as a polishing surface on the head part end surface 2210 after the polishing process during the head manufacture is formed in the predetermined shape (a triangular shape in the present embodiment) and its size is extremely small, it becomes possible that the surface plasmon certainly propagates to the near-field light generator end surface 36a thereupon.

Further, in the conventional configuration where laser light propagating through the waveguide is directly irradiated by a plasmon generator disposed at the position of a head end surface, most portions of the irradiated laser light is converted to thermal energy in the plasmon generator. On the other hand, the size of the plasmon generator is set to be the wavelength of the laser light or less, so that its volume is extremely small. Accordingly, due to the thermal energy, the plasmon generator reaches extremely high temperature, for example, 500° C. In contrast, in the TAMR of the present embodiment, the surface plasmon mode is used and the near-field light 62 is generated by letting the surface plasmon 60 propagate toward the head part end surface 2210.

Thereby, the temperature on the near-field light generator end surface 36a when near-field light is generated is substantially is reduced to, for example, approximately more or less 100° C. As a result, it is prevented from the near-field light generator end surface 36a from being projected toward the TAMR medium 10, and this allows to achieve the optimal TAMR.

Figure 14:
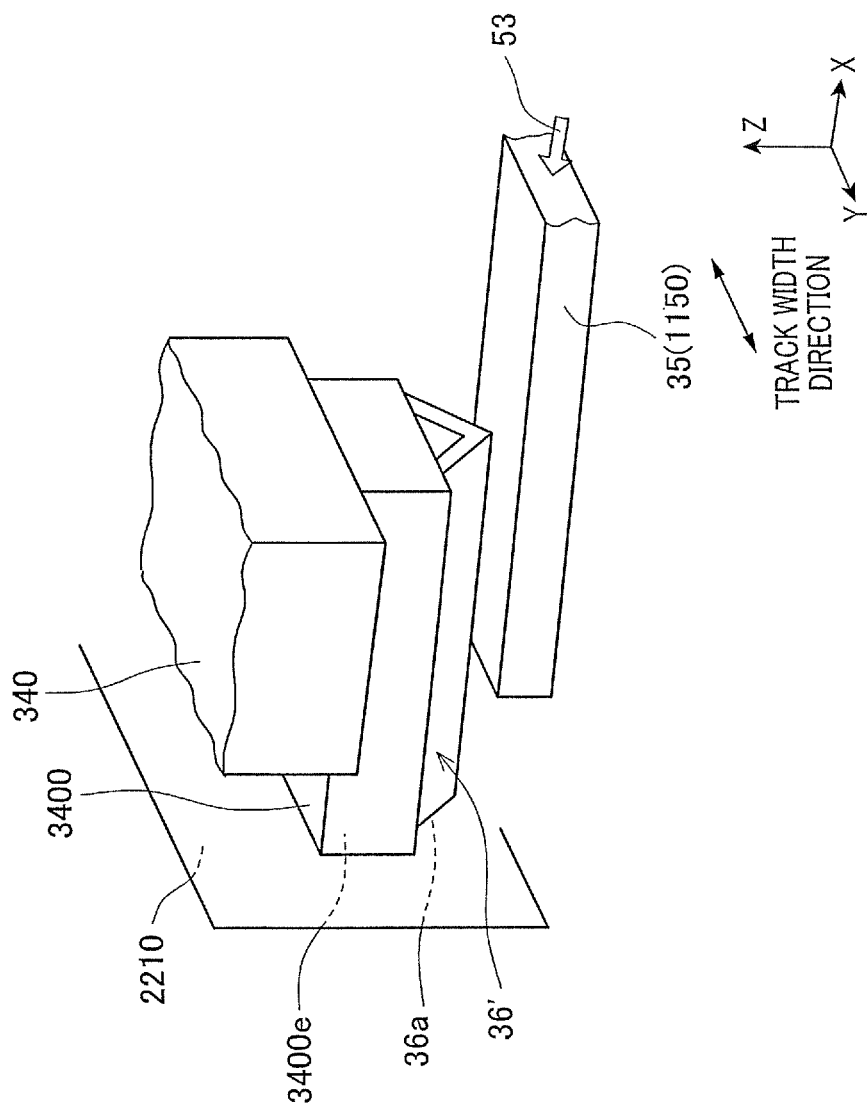
FIG. 14 illustrates a configuration where a plasmon generator according to another embodiment is applied to FIG. 11, and is a perspective view schematically illustrating a configuration of a waveguide, a plasmon generator and a main pole layer.
Figure 15:
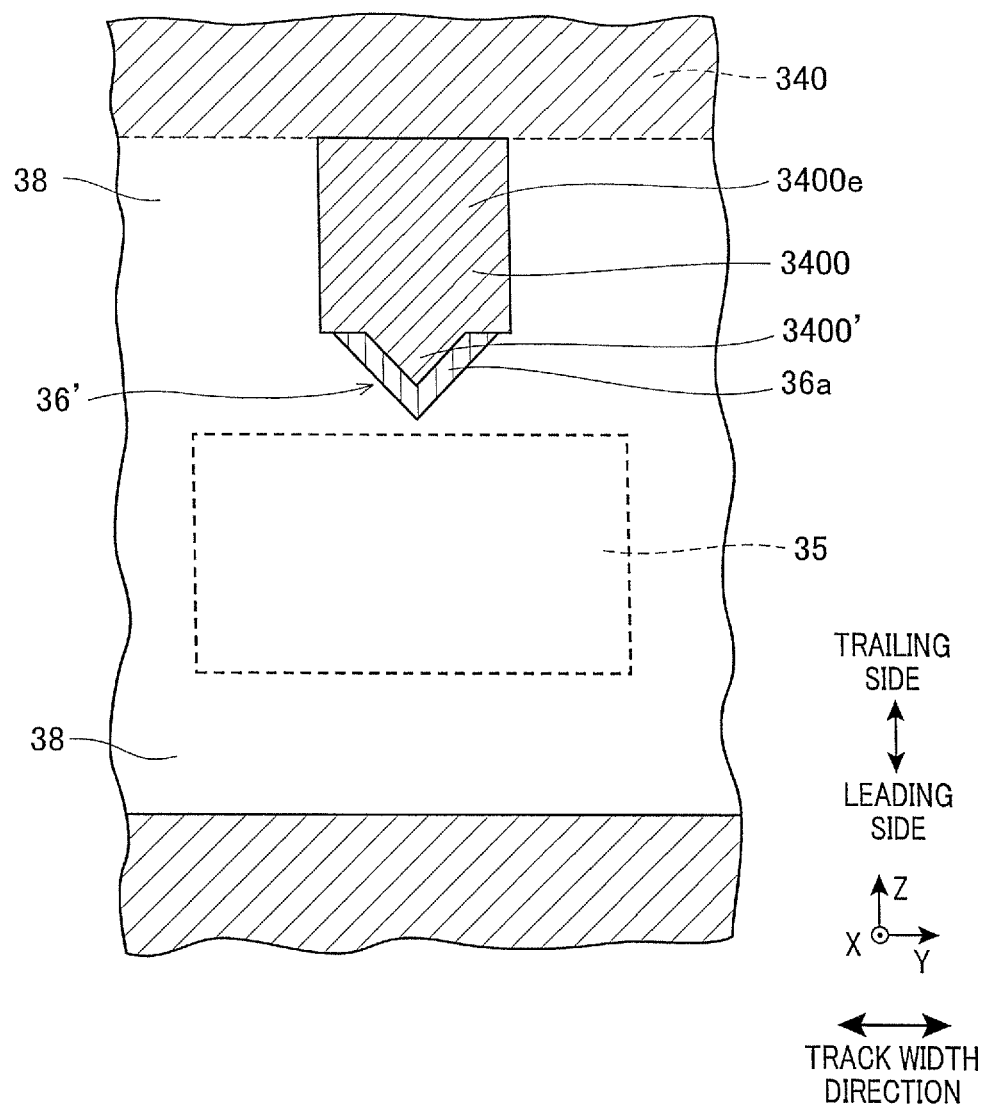
FIG. 15 illustrates a configuration where a plasmon generator according to another embodiment is applied to FIG. 12, and is a plan view illustrating shapes of end surfaces of the plasmon generator and the electromagnetic transducer element on the head part end surface.

Note, the configuration of the plasmon generator 36 as illustrated in FIG. 11-FIG. 13 may be also used replacing with a plasmon generator 36' as illustrated in FIG. 14-FIG. 15.

The plasmon generator 36' as illustrated in FIG. 14-FIG. 15 has an end surface 36a on the ABS side that is formed in a cross sectional V-shape, and has a configuration where the same shape is extended. In this case, the lower part of the main pole 3400 is configured such that a convex part 3400' in the cross sectional V-shape is extended in the −Z direction, and the plasmon generator 36' in the cross sectional V-shape is configured so as to adhere to the convex part 3400' in the cross sectional V-shape. A tip of a V-shape of the plasmon generator 36' is a propagative edge, and a surface plasmon mode is induced at the propagative edge. In other words, laser light in the waveguide 35 that has reached to the vicinity of the buffer portion is coupled with an optical configuration of the buffer portion and the plasmon generator 36' so as to induce the surface plasmon mode at the propagative edge of the plasmon generator 36'. In the induced surface plasmon mode, the surface plasmon is induced on the propagative edge of the plasmon generator 36' to propagate on the propagative edge along the ABS direction (the −X direction), and so that the near-field light is generated from the ABS end surface of the propagative edge toward the magnetic recording medium.

Such configuration allows to arrange the near-field light generator in which light emission position is controlled in the vicinity of a pole so that the distance between a pole for writing and the near-field light generator can be decreased.

Note, the plasmon generator is not limited to the configuration of the plasmon generator 36' in FIG. 14-FIG. 15. As further modified examples, a plasmon generator having respective wings (in the Y direction and the −Y direction) additionally disposed on both sides of an upper end portion of the V-shape of the cross sectional V-shape, and a plasmon generator having the cross sectional V-shape in the vicinity of the ABS end surface and being wider as a boat shape as getting backward (the X direction) may be used. Also in the modified examples, the pole is configured to have a convex shape so as to adhere to the concave portion of the plasmon generator.

[Description of TAMR Medium 10]

Detailed description is given regarding a preferable embodiment of a TAMR medium of the present invention, which is a target to which recording/reproducing of magnetic information is performed by the above-described TAMR head.

First Embodiment

FIG. 1 is a cross-sectional view schematically illustrating a preferable configuration example of a first embodiment of a TAMR medium of the present invention. As illustrated in FIG. 1, a TAMR medium 10 of the present invention is configured with a lamination structure in which a soft under layer (SUL) 103, a thermal barrier layer 105, a magnetization direction arrangement layer 107, a magnetic recording layer 109, a protective layer 111 are laminated in this order on a substrate 101.

(Description of Substrate 101)

For the substrate 101 of the present invention, glass, aluminum, silicon, plastic, or the like can be used. Also, a composite substrate can be used as well in which a metal, a ceramic, or the like is deposited on a substrate made of a hard material. A thickness of such substrate 101 is not limited in particular; however, the thickness is set to, for example, approximately 0.5-1.0 mm. As a configuration of the substrate 101, a configuration in a disk-shape is common.

(Description of Soft Under Layer 103)

In the embodiment illustrated in FIG. 1, the SUL 103 is formed between the substrate 101 and the thermal barrier layer 105.

The SUL 103 is disposed so as to generate a steep and large magnetic field in the perpendicular direction due to a magnetic interaction with a recording head.

As materials used for the SUL 103, CoTaZr, CoFeTaZrCr, CoNbZr, CoNiZr, FeCoZrBCu, NiFe, FeCo, FeAlN, (FeCo)N, FeAlSi, FeTaC or the like can be listed. Out of these, CoFeTaZrCr is preferable.

A film thickness of the SUL 103 is set to, for example, 25-80 nm. Though may be affected by the magnetic interaction with the magnetic head to be used, sufficiently high head magnetic field intensity for obtaining a magnetization transition of high signal to noise ratio (SNR) occasionally cannot be obtained when the thickness is less than 25 nm. On the other hand, when the thickness excesses over 80 nm, a disadvantage that direct current (DC) noise is increased tends to occur.

A thermal conductivity of the SUL 103 is preferably in the range of 55-150 W/m·K.

(Description of Thermal Barrier Layer 105)

In the embodiment illustrated in FIG. 1, the thermal barrier layer 105 is formed between the SUL 103 and the magnetization direction arrangement layer 107. The thermal barrier layer 105 develops the function for temporarily storing heat applied from the thermally-assisted magnetic head.

As materials used for the thermal barrier layer 105, MgO, TiOx, RuAl, Cr, ZnO, TiN, $B_2O_3$ or the like can be listed. Out of these, MgO are TiOx are preferable to use.

Though may be affected by the magnetic and thermal interaction with the magnetic head to be used, a film thickness of the thermal barrier layer 105 is set to, for example, 1-5 nm.

A thermal conductivity of the thermal barrier layer 105 is preferably in the range of 0.1-15 W/m·K.

(Description of Magnetization Direction Arrangement Layer 107)

In the embodiment illustrated in FIG. 1, the magnetization direction arrangement layer 107 is formed below the magnetic recording layer 109. The magnetization direction arrangement layer 107 functions to align magnetizations recorded to the magnetic recording layer 109, and thereby the SNR is increased. Also, since the magnetization direction arrangement layer 107 is located below the magnetic recording layer, spreading of, for example, an irradiation area (heated area) by near-field light that is irradiated for heating can be prevented in combination with a granular structure or the like of the magnetic recording layer. As a result, a larger temperature gradient in the medium, an improvement in the SNR, and a narrower track width can be achieved so as to function with specific advantages for achieving the higher density recording.

As materials used for the magnetization direction arrangement layer 107, Co, Zr, CoZr, CoTaZr, CoFeTaZrCr, CoNbZr, CoNiZr, FeCoZrBCu, NiFe, FeCo, FeAlN, (FeCo)N, FeAlSi, FeTaC or the like can be listed. Out of these, it is preferred to use NiFe having a relatively lower thermal conductivity from the viewpoint that the energy of thermal assist can be suppressed low.

Though may be affected by the magnetic and thermal interaction with the magnetic head to be used, a film thickness of the magnetization direction arrangement layer 107 is set to, for example, 1-5 nm, and more preferably 1.5-2.5 nm.

When the film thickness is less than 1 nm, a tendency occurs that becomes difficult to achieve the higher density recording; however, on the other hand, when the film thickness excesses over 5 nm, a disadvantage occurs that a thermal gradient is decreased.

Note, a material configuring the magnetization direction arrangement layer 107 is a substantially similar material to the material for the above-described SUL 103. However, the magnetization direction arrangement layer 107 and the above-described SUL 103 are obviously distinguishable from the difference of the largeness of the film thickness and the positions at which the magnetization direction arrangement layer 107 or the above SUL 103 are arranged for configuring the medium.

A thermal conductivity of the magnetization direction arrangement layer 107 is preferably in the range of 10-50 W/m·K.

(Description of Magnetic Recording Layer 109)

In the embodiment illustrated in FIG. 1, the magnetic recording layer 109 is formed on the magnetization direction arrangement layer 107. In other words, a configuration where the magnetic recording layer is formed on the magnetization direction arrangement layer is applied.

Herein, "is formed on" means not only forming directly without any other film therebetween but also forming with an orientation layer (for example, MgO, TiO, ZnO, CrO or the like having the thickness of several nm) that functions as an orientation under film for making perpendicular orientation of magnetic particles of the magnetic recording layer 109 easy and forming with the thermal barrier layer therebetween as illustrated in a seventh embodiment, which is described later.

The magnetic recording layer 109 in the present invention is configured as a so-called perpendicular magnetization film, and is preferably configured with a granular-system magnetic layer formed of CoCrPt—$SiO_2$, FePt—C, FePt—$SiO_2$, FePtCu—C, or FePtCu—SiO or a multilayer film magnetic layer formed of Co/Pd or CoB/Pd. The above-described granular-system magnetic layer has a so-called granular structure in which a nonmagnetic material such as $SiO_2$, C or the like is formed at a grain boundary between the magnetic particles formed of CoCrPt or FePt. Instead of the nonmagnetic material such as $SiO_2$ or C, nonmagnetic materials such as O, TiOx, TaOx, B or the like can be also used. In the present invention, it is preferred in particular to use the granular-system magnetic layer. This is because heat is less likely to spread in an in-plane direction so as to make a heating area smaller.

A film thickness of the magnetic recording layer 109 is set to, for example, 5-20 nm.

Also, a thermal conductivity of the magnetic recording layer 109 is set to, for example, appropriately 2.0-30 W/m·K.

(Protective Layer 111)

Note, normally a protective film 111 is formed on the magnetic recording layer 109.

It is preferred to use diamond like carbon (DLC) as the protective film 111. In the present invention, a cap layer that is made of a so-called metal or metallic alloy (for example, a cap layer made of Fe—Pt or Co—Cr—Cr—Pt—B alloy)

does not exist on the magnetic recording layer 109. The cap layer made of such metal or metallic alloy can function to align magnetizations recorded to the magnetic recording layer; however, a tendency occurs that becomes difficult to achieve the higher density recording because heat applied from the magnetic head spreads in an in-plane direction. With such reasons as well, in the present invention, such a cap layer is not used and the magnetization direction arrangement layer 107, which enables to improve the SNR and achieve a narrower track width and functions advantageously in particular for achieving the higher density recording is formed below the magnetic recording layer 109.

Second Embodiment

FIG. 2 is a cross-sectional view schematically illustrating a preferable configuration example of a second embodiment of the TAMR medium of the present invention. As illustrated in FIG. 2, a TAMR medium 10 of the second embodiment is configured with a lamination structure in which a SUL 103, a magnetization direction arrangement layer 107, a magnetic recording layer 109, and a protective layer 111 are laminated in this order on a substrate 101.

A different point of the TAMR medium 10 of the second embodiment illustrated in FIG. 2 from that of the first embodiment illustrated in the above-described FIG. 1 is that the thermal barrier layer 105 is eliminated and is not formed in the TAMR medium 10 of the second embodiment. Since the TAMR medium 10 of the second embodiment has the same configuration as the TAMR medium 10 of the above-described first embodiment other than the point, detailed description of each of the configuration layers herein is omitted.

Also in the TAMR medium 10 of the second embodiment, a cap layer that is made of a metal or a metallic alloy does not exist on the magnetic recording layer 109. Below the magnetic recording layer 109, the magnetization direction arrangement layer 107 is formed. This enables to prevent a heating area by thermally-assisted recording from spreading. As a result, the temperature gradient in the medium can be larger, it becomes able to improve the SNR and to achieve a narrower track width, and a particularly advantageous function for achieving the higher density recording can be obtained.

Note, the merit of not forming the thermal barrier layer 105 in the TAMR medium 10 of the second embodiment is cost reduction because of the decrease in the number of formation films. On the other hand, the demerit of not forming the thermal barrier layer 105 is that it is impossible to receive the benefit of the thermal barrier layer so that sufficient recording performance may not be obtained when heating ability of the head lacks.

Third Embodiment

Figure 3:
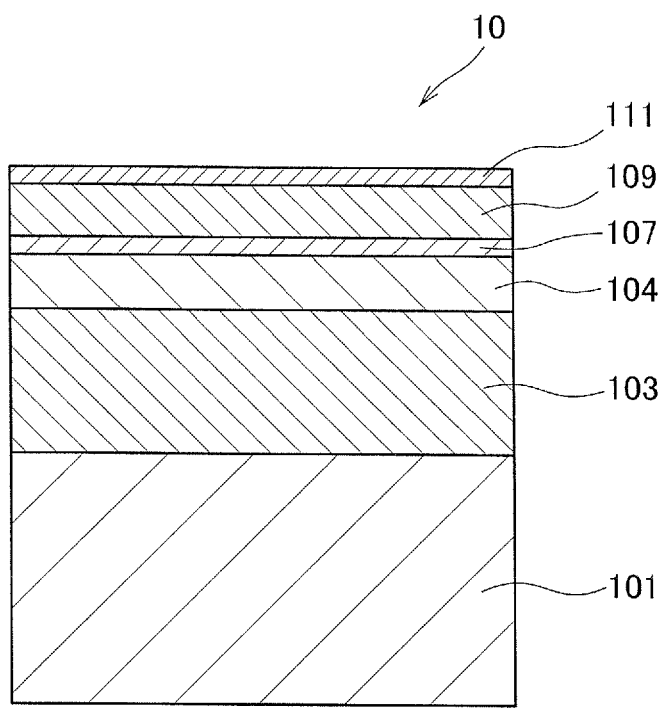
FIG. 3 is a cross-sectional view schematically illustrating another configuration example of the TAMR medium of the present invention.

FIG. 3 is a cross-sectional view schematically illustrating a preferable configuration example of a third embodiment of the TAMR medium of the present invention. As illustrated in FIG. 3, a TAMR medium 10 of the third embodiment is configured with a lamination structure in which a SUL 103, a heat sink layer 104, a magnetization direction arrangement layer 107, a magnetic recording layer 109, and a protective layer 111 are laminated in this order on a substrate 101.

A different point of the TAMR medium 10 of the third embodiment illustrated in FIG. 3 from that of the first embodiment illustrated in the above-described FIG. 1 is that a heat sink layer 104 is formed as substitute for the thermal barrier layer 105. Other than the point, the TAMR medium 10 of the third embodiment has the same configuration as the TAMR medium 10 of the above-described first embodiment.

As a material used for the heat sink layer 104, a simple substance and an alloy, etc. of Cu, Ag, and Au can be listed. Out of these, it is preferable to use CuAg in particular.

Though may be affected by magnetic and thermal interaction with the magnetic head to be used, a film thickness of the heat sink layer 104 is set to approximately 5-50 nm.

A thermal conductivity of the heat sink layer 104 is preferably set in the range of 100-430 W/m·K.

Also in the TAMR medium 10 of the third embodiment, a cap layer that is made of a metal or a metallic alloy does not exist on the magnetic recording layer 109. Below the magnetic recording layer 109, the magnetization direction arrangement layer 107 is formed. This enables to prevent a heating area by thermally-assisted recording from spreading. As a result, the temperature gradient in the medium can become larger, it becomes able to improve the SNR and achieve a narrower track width, and a particularly advantageous function for achieving the higher density recording can be obtained.

The merit of forming the heat sink layer 104 in the TAMR medium 10 of the third embodiment as substitute for the thermal barrier layer 105 is that a spot diameter and thermal gradient can be improved by adjusting a material of the heat sink.

Fourth-Sixth Embodiments

Figure 4:
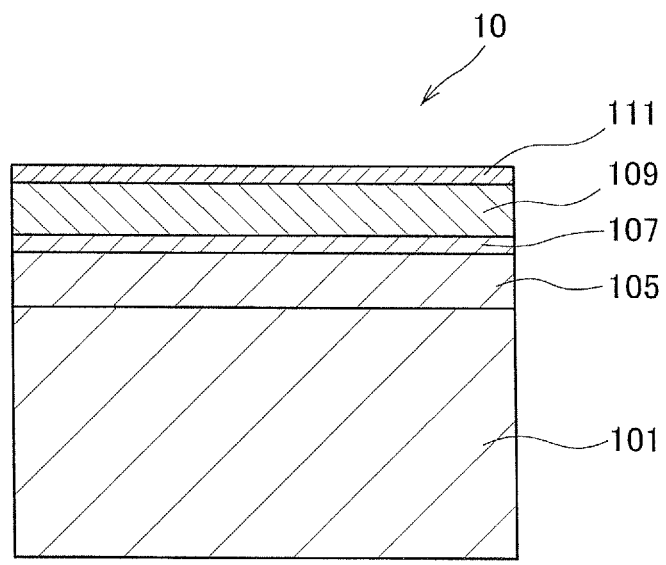
FIG. 4 is a cross-sectional view schematically illustrating another configuration example of the TAMR medium of the present invention.
Figure 5:
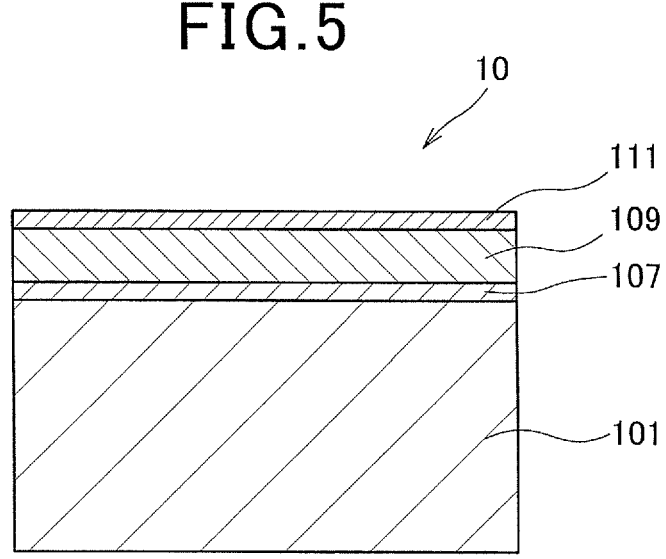
FIG. 5 is a cross-sectional view schematically illustrating another configuration example of the TAMR medium of the present invention.
Figure 6:
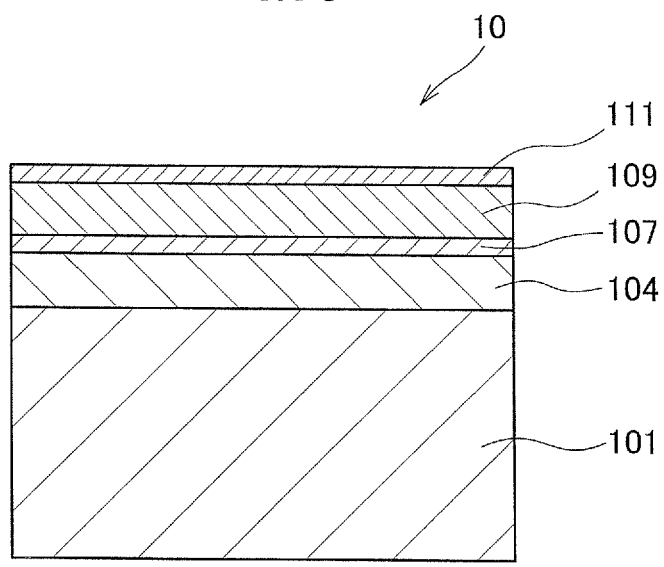
FIG. 6 is a cross-sectional view schematically illustrating another configuration example of the TAMR medium of the present invention.

FIG. 4 is a cross-sectional view schematically illustrating a preferable configuration example of a fourth embodiment of the TAMR medium of the present invention. As illustrated in FIG. 4, a TAMR medium 10 of the fourth embodiment is configured with a lamination structure in which a thermal barrier layer 105, a magnetization direction arrangement layer 107, a magnetic recording layer 109, and a protective layer 111 are laminated in this order on a substrate 101. FIG. 5 is a cross-sectional view schematically illustrating a preferable configuration example of a fifth embodiment of the TAMR medium of the present invention. As illustrated in FIG. 5, a TAMR medium 10 of the fifth embodiment is configured with a lamination structure in which a magnetization direction arrangement layer 107, a magnetic recording layer 109, and a protective layer 111 are laminated in this order on a substrate 101. FIG. 6 is a cross-sectional view schematically illustrating a preferable configuration example of a sixth embodiment of the TAMR medium of the present invention. As illustrated in FIG. 6, a TAMR medium 10 of the sixth embodiment is configured with a lamination structure in which a heat sink layer 104, a magnetization direction arrangement layer 107, a magnetic recording layer 109, and a protective layer 111 are laminated in this order on a substrate 101.

Different points of the fourth-sixth embodiments illustrated in FIG. 4-FIG. 6 from the first-third embodiments illustrated in the FIG. 1-FIG. 3 are that the SUL 103 is eliminated and is not formed. The fourth-sixth embodiments illustrated in FIG. 4-FIG. 6 are the same as the first-third embodiments illustrated in the FIG. 1-FIG. 3 other than the points.

Also in the TAMR mediums 10 of the fourth-sixth embodiments, cap layers that are made of a metal or a metallic alloy are not on the magnetic recording layers 109. Below the magnetic recording layers 109, the magnetization direction arrangement layers 107 are formed. This enables to prevent heating areas by thermally-assisted recording from spreading. As a result, the temperature gradients in the mediums can become larger, it becomes able to improve the SNRs and achieve narrower track widths, and particularly advantageous functions for achieving the higher density recording can be obtained.

The fourth-sixth embodiments describe that the SUL 103 is omittable for TAMR in particular. The merit of omitting the SUL 103 is cost reduction and process simplification. However, compared to the fourth-sixth embodiments, a stronger recording magnetic field can be obtained with the first-third embodiments in which the SUL 103 is disposed, and this provides a guarantee for a temperature control and an improved reliability of the medium. Therefore, the first-third embodiments are more preferable.

Seventh Embodiment

Figure 7A:
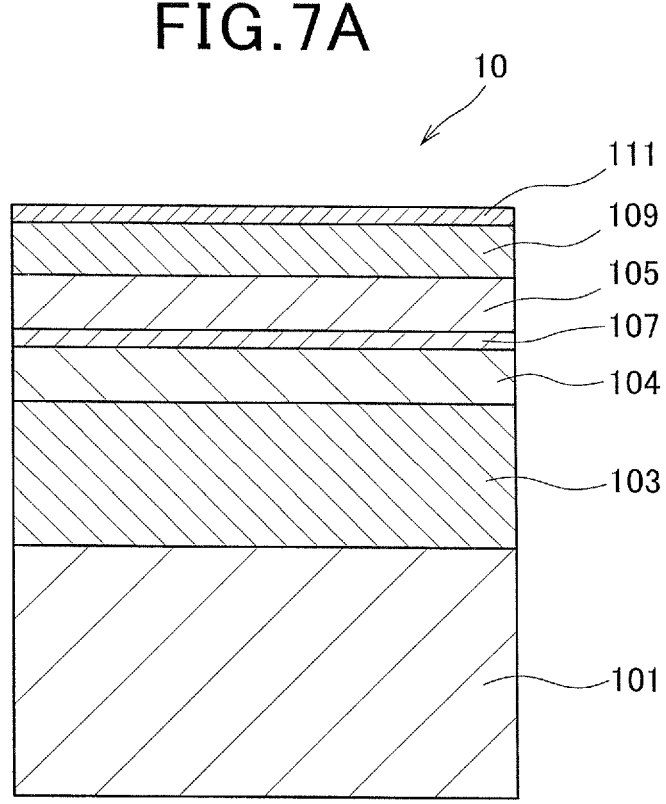
FIGS. 7A and 7B are cross-sectional views respectively schematically illustrating other configuration examples of the TAMR medium of the present invention.

FIG. 7A is a cross-sectional view schematically illustrating a preferable configuration example of a seventh embodiment of the TAMR medium of the present invention. As illustrated in FIG. 7A, a TAMR medium 10 of the seventh embodiment is configured with a lamination structure in which a SUL 103, a heat sink layer 104, a magnetization direction arrangement layer 107, a thermal barrier layer 105, a magnetic recording layer 109, and a protective layer 111 are laminated in this order on a substrate 101.

A different point of the TAMR medium 10 of the seventh embodiment illustrated in FIG. 7A from that of the third embodiment illustrated in FIG. 3 is that a thermal barrier layer 105 is formed between the magnetization direction arrangement layer 107 and the magnetic recording layer 109.

A merit that material with high thermal conductivity can be used for the magnetization direction arrangement layer occurs by disposing the thermal barrier layer 105.

Also in the TAMR medium 10 of the seventh embodiment, a cap layer that is made of a metal or a metallic alloy does not exist on the magnetic recording layer 109. Below the magnetic recording layer 109, the magnetization direction arrangement layer 107 is formed with the thermal barrier layer 105 therebetween. This enables to prevent a heating area by thermally-assisted recording from spreading. As a result, it becomes able to achieve a narrower track width, and a particularly advantageous function for achieving the higher density recording can be obtained.

Eighth Embodiment

Figure 7B:
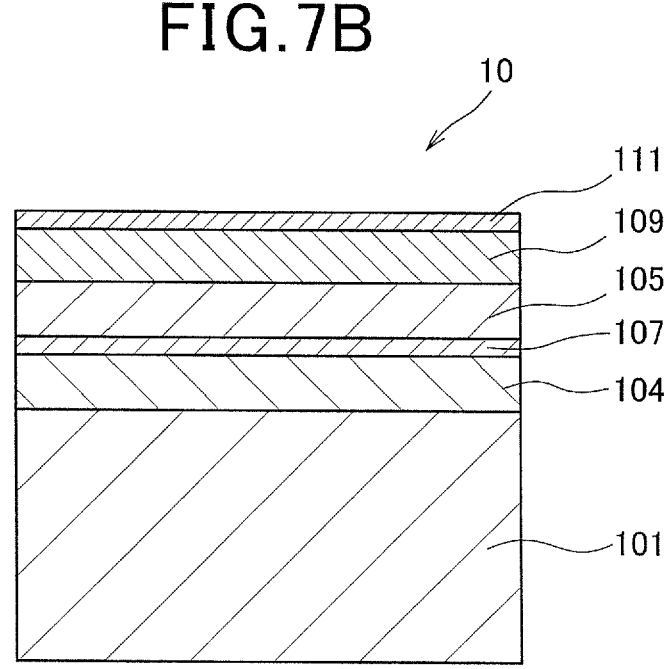

FIG. 7B is a cross-sectional view schematically illustrating a preferable configuration example of an eighth embodiment of the TAMR medium of the present invention. As illustrated in FIG. 7B, a different point in a TAMR medium 10 of the eighth embodiment from the seventh embodiments illustrated in the FIG. 7A is that a SUL 103 is eliminated and is not formed. The TAMR medium 10 of the eighth embodiment is the same as the seventh embodiment illustrated in the FIG. 7A other than the point. In other words, the TAMR medium 10 of the eighth embodiment illustrated in FIG. 7B is configured with a lamination structure in which a heat sink layer 104, a magnetization direction arrangement layer 107, a thermal barrier layer 105, a magnetic recording layer 109, and a protective layer 111 are laminated in this order on a substrate 101. The merit of eliminating the SUL is a cost reduction and a process simplification.

Ninth Embodiment

Figure 7C:
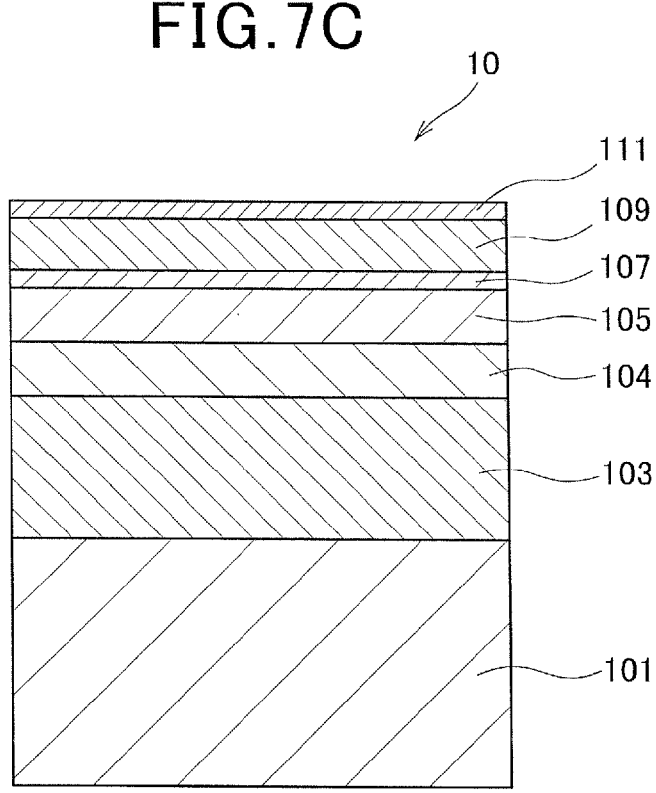
FIGS. 7C and 7D are cross-sectional views respectively schematically illustrating other configuration examples of the TAMR medium of the present invention.

FIG. 7C is a cross-sectional view schematically illustrating a preferable configuration example of a ninth embodiment of the TAMR medium of the present invention. As illustrated in FIG. 7C, a TAMR medium 10 of the ninth embodiment is configured with a lamination structure in which a SUL 103, a heat sink layer 104, a thermal barrier layer 105, a magnetization arrangement layer 107, a magnetic recording layer 109, and a protective layer 111 are laminated in this order on a substrate 101.

A different point of the TAMR medium 10 of the ninth embodiment illustrated in FIG. 7C from that of the third embodiment illustrated in FIG. 3 is that a thermal barrier layer 105 is formed between the heat sink layer 104 and the magnetization direction arrangement layer 107.

The merit of disposing the thermal barrier layer 105 is that material with a high thermal conductivity can be used for the magnetization direction arrangement layer.

Also in the TAMR medium 10 of the ninth embodiment, a cap layer that is made of a metal or a metallic alloy does not exist on the magnetic recording layer 109. Below the magnetic recording layer 109, the magnetization direction arrangement layer 107 is formed. This enables to prevent a heating area by thermally-assisted recording from spreading. As a result, it becomes able to achieve a narrower track width, and a particularly advantageous function for achieving the higher density recording can be obtained. The ninth embodiment is one of the specifically preferable embodiments.

Tenth Embodiment

Figure 7D:
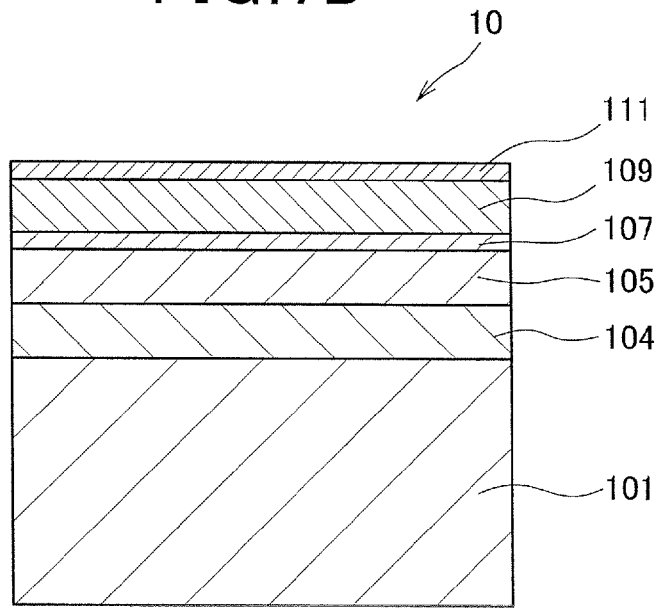

FIG. 7D is a cross-sectional view schematically illustrating a preferable configuration example of a tenth embodiment of the TAMR medium of the present invention. As illustrated in FIG. 7D, a different point in a TAMR medium 10 of the tenth embodiment from the ninth embodiment illustrated in the FIG. 7C is that a SUL 103 is eliminated and is not formed. The TAMR medium 10 of the tenth embodiment is the same as the ninth embodiment illustrated in the FIG. 7C other than the points. In other words, the TAMR medium 10 of the tenth embodiment illustrated in FIG. 7D is configured with a lamination structure in which a heat sink layer 104, a thermal barrier layer 105, a magnetization direction arrangement layer 107, a magnetic recording layer 109, and a protective layer 111 are laminated in this order on a substrate 101. The merit of eliminating the SUL layer is a cost reduction and a process simplification. The tenth embodiment is one of the specifically preferable embodiments.

Regarding the above-described TAMR medium 10 of the present invention, the present invention is further described in detail by explaining specific experimental examples hereinafter.

Experimental Example I

Following descriptions as will be explained below, a sample of the TAMR medium of the present invention (example 1 sample), a sample of a TAMR medium of a comparative example 1 (comparative example 1 sample), and a sample of a TAMR medium of a comparative example 2 (comparative example 2 sample) were manufactured.

(Manufacture of Example 1 Sample)

A sample of a TAMR medium of an example 1 was manufactured (see FIG. 4) as follows: a glass having a thickness of 0.8 mm was prepared as a substrate 101; a thermal barrier layer 105 made of MgO was formed so as to have a film thickness of 2 nm on the substrate; a magnetization direction arrangement layer 107 made of NiFe was formed so as to have a film thickness of 2 nm on the thermal barrier layer 105; a magnetic recording layer 109 with FePt—$SiO_2$ granular structure was formed to have a film thickness of 7.5 nm on the magnetization direction arrangement layer 107; and DLC was formed to have a film thickness of 2 nm as a protective layer 111 on the magnetic recording layer 109. In other words, a lamination structure of substrate 101/thermal barrier layer 105/magnetization direction arrangement layer 107/magnetic recording layer 109/protective layer 111 was applied.

Note, specific characteristics of a thermal conductivity, a specific heat, and an optical loss of materials configuring the thermal barrier layer (MgO), the magnetization direction arrangement layer (NiFe) and the magnetic recording layer (FePt—$SiO_2$), which configure the sample of the TAMR medium, was as follows:

Thermal barrier layer (MgO)
Thermal conductivity=1 (W/(m·K))
Specific heat=3.10 (J/cc·K)
Optical loss=0 (Ωcm)
Magnetization direction arrangement layer (NiFe)
Thermal conductivity=14.7 (W/(m·K))
Specific heat=3.83 (J/cc·K)
Optical loss=$3.70 \times 10^{-3}$ (Ωcm)
Magnetic recording layer (FePt—$SiO_2$)
Thermal conductivity=5 (W/(m K))
Specific heat=3.09 (J/cc·K)
Optical loss=$3.70 \times 10^{-3}$ (Ωcm)

(Manufacture of Comparative Example 1 Sample)

A sample of a TAMR medium of a comparative example 1 was manufactured as follows: a glass having the thickness of 0.8 mm was prepared as a substrate 101; a thermal barrier layer 105 made of MgO was formed so as to have a film thickness of 2 nm on the substrate; a magnetic recording layer 109 with FePt—$SiO_2$ granular structure was formed to have a film thickness of 7.5 nm on the thermal barrier layer 105; a cap layer made of Co was formed so as to have a film thickness of 2 nm on the magnetic recording layer 109; and DLC was formed to have a film thickness of 2 nm as a protective layer 111 on the cap layer. In other words, a lamination structure of substrate 101/thermal barrier layer 105/magnetic recording layer 109/cap layer (Co)/protective layer 111 was applied.

Note, specific characteristics of a thermal conductivity, a specific heat, and an optical loss of materials configuring the thermal barrier layer (MgO) and the magnetic recording layer (FePt—$SiO_2$), which configure the sample of the TAMR medium, was as described above. Specific characteristics of a thermal conductivity, a specific heat, and an optical loss of a material configuring the cap layer (Co) were as follows.

Cap layer (Co)
Thermal conductivity=100 (W/(m·K))
Specific heat=3.83 (J/cc·K)
Optical loss=$3.70 \times 10^3$ (Ωcm)

(Manufacture of Comparative Example 2 Sample)

A sample of a TAMR medium of a comparative example 2 was manufactured as follows: a glass having the thickness of 0.8 mm was prepared as a substrate 101; a thermal barrier layer 105 made of MgO was formed so as to have a film thickness of 2 nm on the substrate; a magnetic recording layer 109 with FePt—$SiO_2$ granular structure was formed to have a film thickness of 7.5 nm on the thermal barrier layer 105; a cap layer made of NiFe was formed so as to have a film thickness of 2 nm on the magnetic recording layer 109; and DLC was formed to have a film thickness of 2 nm as a protective layer 111 on the cap layer. In other words, a lamination structure of substrate 101/thermal barrier layer 105/magnetic recording layer 109/cap layer (NiFe)/protective layer 111 was applied.

Note, specific characteristics of a thermal conductivity, a specific heat, and an optical loss of the thermal barrier layer (MgO) and the magnetic recording layer (FePt—$SiO_2$), which configure the sample of the TAMR medium, was as described above. Specific characteristics of a thermal conductivity, a specific heat, and an optical loss of a material configuring the cap layer (NiFe) were as follows.

Cap layer (NiFe)
Thermal conductivity=14.7 (W/(m·K))
Specific heat=3.83 (J/cc·K)
Optical loss=$3.70 \times 10^{-3}$ (Ωcm)

For the samples of the TAMR media, which were manufactured above, heat calculation and magnetic calculation for magnetic recording were performed by LLG Micromagnetics Simulator using a thermally-assisted magnetic head, formed with the structure illustrated in FIG. 15, that generates near-field light. More detailed specifications were set as follows.

<Simulation Condition>

A so-called leading recording was assumed. In other words, a structure in which a magnetic recording core (main pole) was positioned on a downstream side of a near-field light generator was applied.

A spot diameter irradiated from the near-field light generator to a TAMR medium was 60 nm.

A magnetic field gradient from the main pole that emits a writing magnetic field was 100 Oe/nm. Further, a maximum reaching magnetic field was 12000 Oe.

Power of a laser diode that was a light source was adjusted such that a reaching temperature of the TAMR medium was 570K.

A recording density was 2000 kfci (frequency of magnetization reversal per one inch).

An optical waveguide and a near-field light generator were not used for the LLG calculation because they are nonmagnetic.

As described above, the thermal calculation and magnetic calculation for the magnetic recording were performed by the LLG Micromagnetics Simulator, so that (1) temperature gradient dT/dx(K/nm) in the medium, (2) SNR(dB), and (3) track width (nm) were obtained. Table 1 below illustrates the results.

Note, as the temperature gradient dT/dx in the medium is larger, bits per inch (bpi) can be denser, which allows to achieve the higher recording density. Also, as a value of the track width (nm) is smaller, higher recording density can be achieved.

TABLE 1

| Sample No. | Temperature Gradient dT/dx (K/nm) | SNR (dB) | Track Width (nm) |
|---|---|---|---|
| Example 1 | 4.0 | 9.7 | 87 |
| Comparative Example 1 | 2.7 | 5.5 | 113 |
| Comparative Example 2 | 3.3 | 8.2 | 103 |

Experimental Example II

As will be described below, a sample of the TAMR medium of the present invention (example 2-1 sample), a sample of a TAMR medium of a comparative example 2-1 (comparative example 2-1 sample), and a sample of a TAMR medium of a comparative example 2-2 (comparative example 2-2 sample) were manufactured.

(Manufacture of Example 2-1 Sample)

A SUL 103 made of CoFeTaZrCr with a film thickness of 50 nm was additionally disposed between the substrate 101 and the thermal barrier layer 105 to the above-described example 1 (see FIG. 1). Other than that, the sample of the TAMR medium of the example 2-1 was manufactured as in the same manner as the above-described example 1. In other words, a lamination structure of substrate 101/SUL 103/thermal barrier layer 105/magnetization direction arrangement layer 107/magnetic recording layer 109/protective layer 111 was applied.

Note, specific characteristics of a thermal conductivity, a specific heat, and an optical loss of the SUL were as follows.

SUL (CoFeTaZrCr)
Thermal conductivity=92.4 (W/(m K))
Specific heat=3.56 (J/cc·K)
Optical loss=3.70×10$^{-4}$ (Ωcm)

(Manufacture of Comparative Example 2-1 Sample)

A SUL 103 made of CoFeTaZrCr with a film thickness of 50 nm was additionally disposed between the substrate 101 and the thermal barrier layer 105 to the above-described comparative example 1. Other than that, the sample of the TAMR medium of the comparative example 2-1 was manufactured as in the same manner as the above-described comparative example 1. In other words, a lamination structure of substrate 101/SUL 103/thermal barrier layer 105/magnetic recording layer 109/cap layer (Co)/protective layer 111 was applied.

(Manufacture of Comparative Example 2-2 Sample)

A SUL 103 made of CoFeTaZrCr with a film thickness of 50 nm was additionally disposed between the substrate 101 and the thermal barrier layer 105 to the above-described comparative example 2. Other than that, the sample of the TAMR medium of the comparative example 2-2 was manufactured as in the same manner as the above-described comparative example 2. In other words, a lamination structure of substrate 101/SUL 103/thermal barrier layer 105/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 2 below illustrates the results.

TABLE 2

| Sample No. | Temperature Gradient dT/dx (K/nm) | SNR (dB) | Track Width (nm) |
| --- | --- | --- | --- |
| Example 2-1 | 4.2 | 11.7 | 72 |
| Comparative Example 2-1 | 2.9 | 7.5 | 118 |
| Comparative Example 2-2 | 3.5 | 10.2 | 108 |

Example III

As will be described below, a sample of the TAMR medium of the present invention (example 3-1 sample), a sample of a TAMR medium of a comparative example 3-1 (comparative example 3-1 sample), and a sample of a TAMR medium of a comparative example 3-2 (comparative example 3-2 sample) were manufactured.

(Manufacture of Example 3-1 Sample)

A heat sink layer 104 made of CuAg with a film thickness of 20 nm was additionally disposed to the above-described example 1 (see FIG. 6) as a substitute for the thermal barrier layer 105. Other than that, the sample of the TAMR medium of the example 3-1 was manufactured as in the same manner as the above-described example 1. In other words, a lamination structure of substrate 101/heat sink layer 104/magnetization direction arrangement layer 107/magnetic recording layer 109/protective layer 111 was applied.

Note, specific characteristics of a thermal conductivity, a specific heat, and an optical loss of the heat sink layer 104 were as follows.

Heat sink layer (CuAg)
Thermal conductivity=400 (W/(m·K))
Specific heat=3.56 (J/cc·K)
Optical loss=1.57×10$^{-4}$ (Ωcm)

(Manufacture of Comparative Example 3-1 Sample)

A heat sink layer 104 made of CuAg with a film thickness of 20 nm was additionally disposed to the above-described comparative example 1 as a substitute for the thermal barrier layer 105. Other than that, the sample of the TAMR medium of the comparative example 3-1 was manufactured as in the same manner as the above-described comparative example 1. In other words, a lamination structure of substrate 101/heat sink layer 104/magnetic recording layer 109/cap layer (Co)/protective layer 111 was applied.

(Manufacture of Comparative Example 3-2 Sample)

A heat sink layer 104 made of CuAg with a film thickness of 20 nm was additionally disposed to the above-described comparative example 2 as a substitute for the thermal barrier layer 105. Other than that, the sample of the TAMR medium of the comparative example 3-2 was manufactured as in the same manner as the above-described comparative example 1. In other words, a lamination structure of substrate 101/heat sink layer 104/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 3 below illustrates the results.

TABLE 3

| Sample No. | Temperature Gradient dT/dx (K/nm) | SNR (dB) | Track Width (nm) |
| --- | --- | --- | --- |
| Example 3-1 | 2.0 | 4.9 | 139 |
| Comparative Example 3-1 | 1.4 | 2.8 | 203 |
| Comparative Example 3-2 | 1.7 | 4.1 | 185 |

Example IV

As will be described below, a sample of the TAMR medium of the present invention (example 4-1 sample), a sample of a TAMR medium of a comparative example 4-1 (comparative example 4-1 sample), and a sample of a TAMR medium of a comparative example 4-2 (comparative example 4-2 sample) were manufactured.

(Manufacture of Example 4-1 Sample)

A SUL 103 made of CoFeTaZrCr with a film thickness of 50 nm was additionally disposed between the substrate 101 and the heat sink layer 104 to the above-described example 3-1 (see FIG. 3). Other than that, the sample of the TAMR medium of the example 4-1 was manufactured as in the same manner as the above-described example 4-1. In other words, a lamination structure of substrate 101/SUL 103/heat sink layer 104/magnetization direction arrangement layer 107/magnetic recording layer 109/protective layer 111 was applied.

(Manufacture of Comparative Example 4-1 Sample)

A SUL 103 made of CoFeTaZrCr with a film thickness of 50 nm was additionally disposed between the substrate 101 and the heat sink layer 104 to the above-described comparative example 3-1. Other than that, the sample of the TAMR medium of the comparative example 4-1 was manufactured as in the same manner as the above-described comparative example 3-1. In other words, a lamination structure of substrate 101/SUL 103/heat sink layer 104/magnetic recording layer 109/Cap layer (Co)/protective layer 111 was applied.

(Manufacture of Comparative Example 4-2 Sample)

A SUL 103 made of CoFeTaZrCr with a film thickness of 50 nm was additionally disposed between the substrate 101 and the heat sink layer 104 to the above-described comparative example 3-2. Other than that, the sample of the TAMR medium of the comparative example 4-2 was manufactured as in the same manner as the above-described comparative example 3-2. In other words, a lamination structure of substrate 101/SUL 103/heat sink layer 104/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 4 below illustrates the results.

TABLE 4

| Sample No. | Temperature Gradient dT/dx (K/nm) | SNR (dB) | Track Width (nm) |
|---|---|---|---|
| Example 4-1 | 2.2 | 6.9 | 131 |
| Comparative Example 4-1 | 1.6 | 4.8 | 192 |
| Comparative Example 4-2 | 1.9 | 6.1 | 175 |

Example V

As will be described below, a sample of the TAMR medium of the present invention (example 5-1 sample), a sample of a TAMR medium of a comparative example 5-1 (comparative example 5-1 sample), and a sample of a TAMR medium of a comparative example 5-2 (comparative example 5-2 sample) were manufactured.

(Manufacture of Example 5-1 Sample)

The thermal barrier layer 105 was eliminated from the above-described example 1 (see FIG. 5). Other than that, the sample of the TAMR medium of the example 5-1 was manufactured as in the same manner as the above-described example 1. In other words, a lamination structure of substrate 101/magnetization direction arrangement layer 107/magnetic recording layer 109/protective layer 111 was applied.

(Manufacture of Comparative Example 5-1 Sample)

The barrier layer 105 was eliminated from the above-described comparative example 1. Other than that, the sample of the TAMR medium of the comparative example 5-1 was manufactured as in the same manner as the above-described comparative example 1. In other words, a lamination structure of substrate 101/magnetic recording layer 109/cap layer (Co)/protective layer 111 was applied.

(Manufacture of Comparative Example 5-2 Sample)

The barrier layer 105 was eliminated from the above-described comparative example 2. Other than that, the sample of the TAMR medium of the comparative example 5-2 was manufactured as in the same manner as the above-described comparative example 2. In other words, a lamination structure of substrate 101/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 5 below illustrates the results.

TABLE 5

| Sample No. | Temperature Gradient dT/dx (K/nm) | SNR (dB) | Track Width (nm) |
|---|---|---|---|
| Example 5-1 | 1.0 | 2.4 | 174 |
| Comparative Example 5-1 | 0.7 | 1.4 | 226 |
| Comparative Example 5-2 | 0.8 | 2.1 | 206 |

Example VI

As will be described below, a sample of the TAMR medium of the present invention (example 6-1 sample), a sample of a TAMR medium of a comparative example 6-1 (comparative example 6-1 sample), and a sample of a TAMR medium of a comparative example 6-2 (comparative example 6-2 sample) were manufactured.

(Manufacture of Example 6-1 Sample)

A SUL 103 made of CoFeTaZrCr with a film thickness of 50 nm was additionally disposed between the substrate 101 and the magnetization direction arrangement layer 107 to the above-described example 5-1 (see FIG. 2). Other than that, the sample of the TAMR medium of the example 6-1 was manufactured as in the same manner as the above-described example 5-1. In other words, a lamination structure of substrate 101/SUL 103/magnetization direction arrangement layer 107/magnetic recording layer 109/protective layer 111 was applied.

(Manufacture of Comparative Example 6-1 Sample)

A SUL 103 made of CoFeTaZrCr with a film thickness of 50 nm was additionally disposed between the substrate 101 and the magnetization direction arrangement layer 107 to the above-described comparative example 5-1. Other than that, the sample of the TAMR medium of the comparative example 6-1 was manufactured as in the same manner as the above-described comparative example 5-1. In other words, a lamination structure of substrate 101/SUL 103/magnetic recording layer 109/cap layer (Co)/protective layer 111 was applied.

(Manufacture of Comparative Example 6-2 Sample)

A SUL 103 made of CoFeTaZrCr with a film thickness of 50 nm was additionally disposed between the substrate 101 and the magnetization direction arrangement layer 107 to the above-described comparative example 5-2. Other than that, the sample of the TAMR medium of the comparative example 6-2 was manufactured as in the same manner as the above-described comparative example 5-2. In other words, a lamination structure of substrate 101/SUL 103/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 6 below illustrates the results.

TABLE 6

| Sample No. | Temperature Gradient dT/dx (K/nm) | SNR (dB) | Track Width (nm) |
|---|---|---|---|
| Embodiment 6-1 | 1.2 | 4.4 | 132 |
| Comparative Example 6-1 | 0.9 | 3.4 | 194 |
| Comparative Example 6-2 | 1.0 | 4.1 | 177 |

Example VII

As will be described below, a sample of the TAMR medium of the present invention (example 7-1 sample), a sample of a TAMR medium of a comparative example 7-1 (comparative example 7-1 sample), and a sample of a TAMR medium of a comparative example 7-2 (comparative example 7-2 sample) were manufactured.

(Manufacture of Example 7-1 Sample)

A thermal barrier layer 105 (see FIG. 7B) made of MgO with a film thickness of 2 nm was additionally disposed between the magnetization direction arrangement layer 107 and the magnetic recording layer 109 to the above-described example 3-1 (see FIG. 6). Other than that, the sample of the TAMR medium of the example 7-1 was manufactured as in the same manner as the above-described example 3-1. In other words, a lamination structure of substrate 101/heat sink layer 104/magnetization direction arrangement layer 107/thermal barrier layer 105/magnetic recording layer 109/protective layer 111 was applied.

(Manufacture of Comparative Example 7-1 Sample)

A thermal barrier layer 105 made of MgO with a film thickness of 2 nm was additionally disposed between the heat sink layer 104 and the magnetic recording layer 109 to the above-described comparative example 3-1.

Other than that, the sample of the TAMR medium of the comparative example 7-1 was manufactured as in the same manner as the above-described comparative example 3-1. In other words, a lamination structure of substrate 101/heat sink layer 104/thermal barrier layer 105/magnetic recording layer 109/cap layer (Co)/protective layer 111 was applied.

(Manufacture of Comparative Example 7-2 Sample)

A thermal barrier layer 105 made of MgO with a film thickness of 2 nm was additionally disposed between the heat sink layer 104 and the magnetic recording layer 109 to the above-described comparative example 3-2.

Other than that, the sample of the TAMR medium of the comparative example 7-2 was manufactured as in the same manner as the above-described comparative example 3-2. In other words, a lamination structure of substrate 101/heat sink layer 104/thermal barrier layer 105/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 7 below illustrates the results.

TABLE 7

| Sample No. | Temperature Gradient dT/dx (K/nm) | SNR (dB) | Track Width (nm) |
|---|---|---|---|
| Example 7-1 | 6.2 | 11.6 | 92 |
| Comparative Example 7-1 | 4.8 | 10.3 | 100 |
| Comparative Example 7-2 | 5.5 | 11.1 | 92 |

Example VIII

As will be described below, a sample of the TAMR medium of the present invention (example 8-1 sample), a sample of a TAMR medium of a comparative example 8-1 (comparative example 8-1 sample), and a sample of a TAMR medium of a comparative example 8-2 (comparative example 8-2 sample) were manufactured.

(Manufacture of Example 8-1 Sample)

A SUL 103 made of CoFeTaZrCr with a film thickness of 50 nm was additionally disposed between the substrate 101 and the heat sink layer 104 to the above-described example 7-1 (see FIG. 7A). Other than that, the sample of the TAMR medium of the example 8-1 was manufactured as in the same manner as the above-described example 7-1. In other words, a lamination structure of substrate 101/SUL 103/heat sink layer 104/magnetization direction arrangement layer 107/thermal barrier layer 105/magnetic recording layer 109/protective layer 111 was applied.

(Manufacture of Comparative Example 8-1 Sample)

A SUL 103 made of CoFeTaZrCr with a film thickness of 50 nm was additionally disposed between the substrate 101 and the heat sink layer 104 to the above-described comparative example 7-1. Other than that, the sample of the TAMR medium of the comparative example 8-1 was manufactured as in the same manner as the above-described comparative example 7-1. In other words, a lamination structure of substrate 101/SUL 103/heat sink layer 104/thermal barrier layer 105/magnetic recording layer 109/cap layer (Co)/protective layer 111 was applied.

(Manufacture of Comparative Example 8-2 Sample)

A SUL 103 made of CoFeTaZrCr with a film thickness of 50 nm was additionally disposed between the substrate 101 and the heat sink layer 104 to the above-described comparative example 7-2. Other than that, the sample of the TAMR medium of the comparative example 8-2 was manufactured as in the same manner as the above-described comparative example 7-2. In other words, a lamination structure of substrate 101/SUL 103/heat sink layer 104/thermal barrier layer 105/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 8 below illustrates the results.

TABLE 8

| Sample No. | Temperature Gradient dT/dx (K/nm) | SNR (dB) | Track Width (nm) |
|---|---|---|---|
| Example 8-1 | 6.4 | 13.6 | 97 |
| Comparative Example 8-1 | 5.0 | 12.3 | 105 |
| Comparative Example 8-2 | 5.7 | 13.1 | 97 |

Example IX

As will be described below, a sample of the TAMR medium of the present invention (example 9-1 sample), a sample of a TAMR medium of a comparative example 9-1 (comparative example 9-1 sample), and a sample of a TAMR medium of a comparative example 9-2 (comparative example 9-2 sample) were manufactured.

(Manufacture of Example 9-1 Sample)

A thermal barrier layer 105 (see FIG. 7D) made of MgO with a film thickness of 2 nm was additionally disposed between the heat sink layer 104 and the magnetization direction arrangement layer 107 to the above-described example 3-1 (see FIG. 6). Other than that, the sample of the TAMR medium of the example 9-1 was manufactured as in the same manner as the above-described example 3-1. In other words, a lamination structure of substrate 101/heat sink layer 104/thermal barrier layer 105/magnetization direction arrangement layer 107/magnetic recording layer 109/protective layer 111 was applied.

(Manufacture of Comparative Example 9-1 Sample)

A thermal barrier layer 105 made of MgO with a film thickness of 2 nm was additionally disposed between the heat sink layer 104 and the magnetic recording layer 109 to the above-described comparative example 3-1.

Other than that, the sample of the TAMR medium of the comparative example 9-1 was manufactured as in the same manner as the above-described comparative example 3-1. Note, the sample of the TAMR medium of the comparative example 9-1 is the same as the sample of the TAMR medium of the comparative example 7-1. In other words, a lamination structure of substrate 101/heat sink layer 104/thermal barrier layer 105/magnetic recording layer 109/cap layer (Co)/protective layer 111 was applied.

(Manufacture of Comparative Example 9-2 Sample)

A thermal barrier layer 105 made of MgO with a film thickness of 2 nm was additionally disposed between the heat sink layer 104 and the magnetic recording layer 109 to the above-described comparative example 3-2.

Other than that, the sample of the TAMR medium of the comparative example 9-2 was manufactured as in the same manner as the above-described comparative example 3-2. Note, the sample of the TAMR medium of the comparative example 9-2 is the same as the sample of the TAMR medium of the comparative example 7-2. In other words, a lamination structure of substrate 101/heat sink layer 104/thermal barrier layer 105/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 9 below illustrates the results.

TABLE 9

| Sample No. | Temperature Gradient dT/dx (K/nm) | SNR (dB) | Track Width (nm) |
|---|---|---|---|
| Example 9-1 | 6.0 | 12.0 | 85 |
| Comparative Example 9-1 (7-1) | 4.8 | 10.3 | 100 |
| Comparative Example 9-2 (7-2) | 5.5 | 11.1 | 92 |

Example X

As will be described below, a sample of the TAMR medium of the present invention (example 10-1 sample), a sample of a TAMR medium of a comparative example 10-1 (comparative example 10-1 sample), and a sample of a TAMR medium of a comparative example 10-2 (comparative example 10-2 sample) were manufactured.

(Manufacture of Example 10-1 Sample)

A SUL 103 made of CoFeTaZrCr with a film thickness of 50 nm was additionally disposed between the substrate 101 and the heat sink layer 104 to the above-described example 9-1 (see FIG. 7C). Other than that, the sample of the TAMR medium of the example 10-1 was manufactured as in the same manner as the above-described example 9-1. In other words, a lamination structure of substrate 101/SUL 103/heat sink layer 104/thermal barrier layer 105/magnetization direction arrangement layer 107/magnetic recording layer 109/protective layer 111 was applied.

(Manufacture of Comparative Example 10-1)

A SUL 103 made of CoFeTaZrCr with a film thickness of 50 nm was additionally disposed between the substrate 101 and the heat sink layer 104 to the above-described comparative example 9-1. Other than that, the sample of the TAMR medium of the comparative example 10-1 was manufactured as in the same manner as the above-described comparative example 9-1. Note, the sample of TAMR medium of the comparative example 10-1 is the same as the sample of the TAMR medium of the comparative example 8-1. In other words, a lamination structure of substrate 101/SUL 103/heat sink layer 104/thermal barrier layer 105/magnetic recording layer 109/cap layer (Co)/protective layer 111 was applied.

(Manufacture of Comparative Example 10-2 Sample)

A SUL 103 made of CoFeTaZrCr with a film thickness of 50 nm was additionally disposed between the substrate 101 and the heat sink layer 104 to the above-described comparative example 9-2. Other than that, the sample of the TAMR medium of the comparative example 10-2 was manufactured as in the same manner as the above-described comparative example 9-2. Note, the sample of TAMR medium of the comparative example 10-2 is the same as the sample of the TAMR medium of the comparative example 8-2. In other words, a lamination structure of substrate 101/SUL 103/heat sink layer 104/thermal barrier layer 105/magnetic recording layer 109/cap layer (NiFe)/protective layer 111 was applied.

As same as the above-described example I, the thermal calculation and magnetic calculation for the magnetic recording were performed by the LLG Micromagnetics Simulator for each of the medium samples, so that (1) temperature gradient dT/dx (K/nm) in the medium, (2) SNR (dB), and (3) track width (nm) were obtained. Table 10 below illustrates the results.

TABLE 10

| Sample No. | Temperature Gradient dT/dx (K/nm) | SNR (dB) | Track Width (nm) |
|---|---|---|---|
| Example 10-1 | 6.2 | 14.0 | 90 |
| Comparative Example 10-1 (8-1) | 5.0 | 12.3 | 105 |
| Comparative Example 10-2 (8-2) | 5.7 | 13.1 | 97 |

From the results of each of the above-described experiments, the effects of the present invention are obvious. In other words, the TAMR medium of the present invention has the magnetization direction arrangement layer on the substrate and has the magnetic recording layer on the magnetization direction arrangement layer, and the magnetization direction arrangement layer is made of at least one selected from a group consisting of Co, Zr, CoZr, CoTaZr, CoFeTaZrCr, CoNbZr, CoNiZr, FeCoZrBCu, NiFe, FeCo, FeAlN, (FeCo)N, FeAlSi, and FeTaC. As a result, spreading of the heating spot applied from the magnetic head for the thermally-assisted recording to the film surface of the magnetic recording medium can be sufficiently suppressed, and the magnetization directions of the reading magnetizations that have been perpendicularly written are aligned to improve the SN, and thereby the higher recording density can be realized.

What is claimed is:

1. A thermally-assisted magnetic recording (TAMR) medium, comprising:
 a magnetization direction arrangement layer on a substrate; and
 a magnetic recording layer on the magnetization direction arrangement layer, wherein
 the magnetization direction arrangement layer is made of at least one selected from a group consisting of CoZr, CoTaZr, CoFeTaZrCr, CoNbZr, CoNiZr, FeCoZrBCu, NiFe, FeCo, FeAlN, (FeCo)N, FeAlSi, and FeTaC.

2. The TAMR medium according to claim 1, wherein the magnetization direction arrangement layer has a thickness of 1-5 nm.

3. The TAMR medium according to claim 1, further comprising:
 a thermal barrier layer below the magnetization direction arrangement layer, wherein
 the thermal barrier layer is made of at least one selected from a group consisting of MgO, TiOx, RuAl, Cr, ZnO, TiN, and $B_2O_3$.

4. The TAMR medium according to claim 1, further comprising:
 a heat sink layer below the magnetization direction arrangement layer, wherein
 the heat sink layer is made of either a simple substance selected from a group consisting of Cu, Ag, and Au, or an alloy containing at least one of Cu, Ag, and Au.

5. The TAMR medium according to claim 1, further comprising:
 a soft under layer (SUL) below the magnetization direction arrangement layer.

6. The TAMR medium according to claim 3, further comprising:
 a soft under layer (SUL) below the thermal barrier layer.

7. The TAMR medium according to claim 4, further comprising:
 a soft under layer (SUL) below the heat sink layer.

8. The TAMR medium according to claim 4, further comprising:
 a thermal barrier layer between the magnetization direction arrangement layer and the magnetic recording layer.

9. The TAMR medium according to claim 7, further comprising:
 a thermal barrier layer between the magnetization direction arrangement layer and the magnetic recording layer.

10. The TAMR medium according to claim 3, further comprising:
 a heat sink layer below the thermal barrier layer, wherein
 the heat sink layer is made of at least either a simple substance selected from a group consisting of Cu, Ag, and Au, or an alloy containing at least one of Cu, Ag and Au.

11. The TAMR medium according to claim 10, further comprising:
 a soft under layer (SUL) below the heat sink layer.

12. The TAMR medium according to claim 1, wherein
 the magnetic recording layer is either a granular-system magnetic layer formed of CoCrPt—$SiO_2$, FePt—C, FePt—$SiO_2$, FePtCu—C, or FePtCu—SiO or a multi-layer film magnetic layer formed of Co/Pd or CoB/Pd.

13. The TAMR medium according to claim 1, further comprising:
 a protective layer on the magnetic recording layer, wherein the protective layer is made of diamond like carbon (DLC).

14. A magnetic recording/reproducing device, comprising:
 the TAMR medium according to claim 1; and
 a thermally-assisted magnetic head for recording/reproducing magnetic signals to the magnetic recording medium.

15. A thermally-assisted magnetic recording (TAMR) medium, comprising:
 a magnetization direction arrangement layer on a substrate; and
 a magnetic recording layer on the magnetization direction arrangement layer, wherein
 the magnetization direction arrangement layer consists of Co.

16. The TAMR medium according to claim 15, further comprising:
 a soft under layer (SUL) below the magnetization direction arrangement layer.

17. A magnetic recording/reproducing device, comprising:
 the TAMR medium according to claim 15; and
 a thermally-assisted magnetic head for recording/reproducing magnetic signals to the magnetic recording medium.

18. A thermally-assisted magnetic recording (TAMR) medium, comprising:
 a magnetization direction arrangement layer on a substrate; and
 a magnetic recording layer on the magnetization direction arrangement layer, wherein
 the magnetization direction arrangement layer is made of at least one selected from a group consisting of Co, CoZr, CoTaZr, CoFeTaZrCr, CoNbZr, CoNiZr, FeCoZrBCu, NiFe, FeCo, FeAlN, (FeCo)N, FeAlSi, and FeTaC, and the magnetic recording layer is either a granular-system magnetic layer formed of CoCrPt—$SiO_2$, FePt—C, FePt—$SiO_2$, FePtCu—C, or FePtCu—SiO or a multi-layer film magnetic layer formed of Co/Pd or CoB/Pd.

19. The TAMR medium according to claim 18, further comprising:
a soft under layer (SUL) below the magnetization direction arrangement layer.

20. A magnetic recording/reproducing device, comprising:
the TAMR medium according to claim 18; and
a thermally-assisted magnetic head for recording/reproducing magnetic signals to the magnetic recording medium.

* * * * *